United States Patent
Columbia

(10) Patent No.: US 11,820,182 B2
(45) Date of Patent: *Nov. 21, 2023

(54) MAGNETIC FASTENING AND RETAINING DEVICE AND METHOD

(71) Applicant: John R. Columbia, Brownsville, PA (US)

(72) Inventor: John R. Columbia, Brownsville, PA (US)

( * ) Notice: Subject to any disclaimer, the term of this patent is extended or adjusted under 35 U.S.C. 154(b) by 471 days.

This patent is subject to a terminal disclaimer.

(21) Appl. No.: 17/064,240

(22) Filed: Oct. 6, 2020

(65) Prior Publication Data

US 2021/0016619 A1     Jan. 21, 2021

Related U.S. Application Data

(63) Continuation of application No. 15/801,841, filed on Nov. 2, 2017, now Pat. No. 10,800,218.

(60) Provisional application No. 62/416,364, filed on Nov. 2, 2016.

(51) Int. Cl.
| | |
|---|---|
| *B60D 1/52* | (2006.01) |
| *F16B 1/00* | (2006.01) |
| *F16B 5/02* | (2006.01) |
| *B60D 1/60* | (2006.01) |

(52) U.S. Cl.
CPC ............ *B60D 1/52* (2013.01); *B60D 1/60* (2013.01); *F16B 1/00* (2013.01); *B60Y 2410/132* (2013.01); *F16B 5/02* (2013.01); *F16B 2200/83* (2023.08)

(58) Field of Classification Search
CPC ............... B60D 1/52; B60D 1/58; B60D 1/60
See application file for complete search history.

(56) References Cited

U.S. PATENT DOCUMENTS

| | | | | |
|---|---|---|---|---|
| 2,962,317 | A * | 11/1960 | Morse | F16B 37/041 |
| | | | | 411/959 |
| 6,409,203 | B1 * | 6/2002 | Williams | B60D 1/52 |
| | | | | 403/379.3 |
| 6,609,725 | B1 * | 8/2003 | Williams | B60D 1/167 |
| 6,733,029 | B2 | 5/2004 | McCoy et al. | |
| 6,945,550 | B2 | 9/2005 | Williams | |

(Continued)

FOREIGN PATENT DOCUMENTS

| | | |
|---|---|---|
| GB | 2071919 A | 9/1981 |
| KR | 1020140024095 A | 2/2014 |

*Primary Examiner* — Jacob D Knutson
(74) *Attorney, Agent, or Firm* — The Webb Law Firm

(57) ABSTRACT

A magnetic fastening includes a cinch-block having a body with a first and a second opposing side, a throughbore passing through the body from the first opposing side to the second opposing side along a first axis, and a first magnet disposed on a second axis, wherein the second axis is laterally offset from and parallel to the first axis, wherein the first magnet is configured to apply magnetic force to removably attach a cinch-block to the first metallic object, and wherein the throughbore of the cinch-block is configured to align with a first aperture of the first metallic object and a first aperture of a second object; a cinch-pin configured to pass through the aligned throughbore and apertures to securely fasten the first metallic object, the cinch-block, and the second object; and wherein the body of the cinch-block is configured to limit rotation during fastening.

20 Claims, 27 Drawing Sheets

(56) References Cited

U.S. PATENT DOCUMENTS

| | | |
|---|---|---|
| 7,338,065 B1 | 3/2008 | Clausen |
| 7,600,774 B1 * | 10/2009 | Speer ................... B60D 1/58 403/387 |
| 7,806,425 B2 | 10/2010 | Chang |
| 8,328,223 B2 | 12/2012 | Leinenger |
| 8,419,334 B2 | 4/2013 | Ante et al. |
| 9,073,396 B2 | 7/2015 | Aurer et al. |
| 9,242,521 B2 | 1/2016 | Columbia |
| 9,616,722 B2 * | 4/2017 | Williams ............... B60D 1/52 |
| 10,800,218 B2 * | 10/2020 | Columbia ............... B60D 1/52 |
| 11,370,256 B2 * | 6/2022 | Borkholder .......... B60D 1/145 |
| 2005/0167547 A1 | 8/2005 | McLellan |
| 2011/0210530 A1 | 9/2011 | Hancock et al. |
| 2013/0193670 A1 * | 8/2013 | Columbia ............... B60D 1/52 280/495 |
| 2014/0203165 A1 | 7/2014 | Muller |
| 2016/0160904 A1 | 6/2016 | Lee et al. |
| 2017/0159880 A1 | 6/2017 | Stechmann |

* cited by examiner

MAGNETIC FASTENING AND RETAINING DEVICE AND METHOD

CROSS-REFERENCE TO RELATED APPLICATIONS

This application claims priority to U.S. Provisional Patent Application No. 62/416,364, filed on Nov. 2, 2016, the disclosure of which is incorporated by reference as if fully restated herein. This application is a continuation of allowed U.S. patent application Ser. No. 15/801,841, filed on Nov. 2, 2017, and which published as U.S. Patent Application Publication No. 2018/0117979 A1 on May 3, 2018, the disclosure of which is incorporated by reference as if fully restated herein.

BACKGROUND OF THE INVENTION

Field of the Invention

The present invention relates generally to trailer hitch accessories and, more particularly, to an improved hitch accessory fastening and retaining device and method that provides a convenient and easy method of engaging and disengaging a hitch-mounted accessory shank in a trailer hitch receiver tube as well as to a method of firmly securing the shank within the hitch receiver tube utilizing magnetic force.

Technical Considerations

Prior examples of vehicle trailer hitches were comprised of a tow ball fastened to a drawbar that was non-removably attached to the rear bumper or undercarriage of a vehicle. The drawbar and tow ball permanently protruded from the rear of the vehicle. A disadvantage of such a hitch was that the drawbar could not be removed when the hitch was not in use. Oftentimes, individuals would injure their shins by bumping into the hitch when walking behind the vehicle. Owing to the hitch extending beyond the rear bumper, people would also oftentimes unintentionally back into objects causing property damage. In addition, the tow ball would often block the license plate on the rear of the vehicle, thus, when not using the hitch for towing, the tow ball needed to be removed from the drawbar so as not to illegally obstruct the license plate. Removing the tow ball required the use of heavy tools not always readily available and was an inconvenient and time-consuming chore. As a result of these disadvantages, a receiver-type hitch was developed that eliminated the described disadvantages and offered additional benefits as well. Consequently, the most common types of motor vehicle hitches in use today are receiver-type hitches.

Receiver-type hitch assemblies are well known and generally have a four-sided, hollow receiver tube connected to a support structure that is affixed to a vehicle's frame rails. The hollow receiver tube typically has a generally square cross-section and rectangular shape in length. The receiver tube generally comprises at least two aligned apertures located in opposing sidewalls for receiving a hitch pin to secure a removable accessory within the receiver when the accessory's shank is inserted into the receiver and corresponding apertures in the accessory's shank are aligned with the apertures in the receiver. When a receiver-type hitch is attached to a vehicle's undercarriage, the receiver tube is generally located or positioned at the rear center of the vehicle underneath the rear bumper and generally does not extend beyond the most rearward portion of the vehicle. A benefit of a receiver-type hitch is that when a tow ball or other hitch accessory is not in use, the accessory can be removed from the receiver hitch.

Receiver-type hitch-mounted accessories generally have a four-sided shank with an external dimension slightly smaller than the internal dimension of the vehicle's hitch receiver tube, thus permitting the shank to be slidably inserted into the receiver tube. Historically, an accessory shank generally further comprises at least two aligned apertures located in opposing sidewalls for aligning with the apertures in the receiver's sidewalls to receive a hitch pin inserted through both the receiver and accessory shank, thereby securing the accessory in position within the vehicle's hitch receiver tube. Not only are receiver-type hitches useful for accommodating the connection of a drawbar and tow ball for towing, but receiver-type hitches have become a universal connection device or mechanism for attaching a variety of accessories to a vehicle, such as a bicycle carrier, ski rack, canoe rack, ladder rack, luggage rack, truck extension, spare tire carrier, gas can carrier, steps, carry all, ATV carrier, grill carrier, cargo basket, motorcycle carrier, wheelchair carrier, light bar, fishing rod carrier, tool carrier, salt spreader, and numerous other accessories.

While receiver-type hitches are extremely popular, they do have some shortcomings.

It is widely recognized that to permit ease of sliding ball mounts and other accessory shanks into a hitch receiver, the outside dimension of the ball mount shank or other accessory shank often are slightly smaller than the inside dimension of the receiver tubes in which they are inserted. While this allows for ease of attachment insertion and withdrawal, it is undesirable for achieving a snug connection. Too much space between a receiver tube and an accessory shank can cause the accessory to wobble beyond a tolerable amount, and the condition worsens the further the accessory extends from the receiver.

There have been several methods developed addressing the aforementioned shortcoming. For example, U.S. Pat. No. 6,609,725 B1 issued to Marty Williams; U.S. Pat. No. 6,733,029 B2 issued to Richard McCoy and Katherine Adams; U.S. Pat. No. 7,338,065 B1 issued to Eivind Clausen; and U.S. Pat. No. 9,073,396 B2 issued to Austin Laurer, Jacob Belinky, Gail Matheus, and David Hesch, address methods of reducing accessory shank movement within a hitch receiver. The known methods include assemblies configured to reduce movement within a hitch receiver. Typically, they relate to an assembly including a threaded nut or non-threaded block comprising a throughbore that is placed within the cavity of a hollow accessory shank comprising two aligned apertures in opposing shank sidewalls and configured such that, when the assembly is placed within the hollow accessory shank, the throughbore in the nut or block can be aligned with, and retained in alignment with, the two opposing shank apertures in the accessory shank's sidewalls. With the inner shank assembly placed within the accessory's hollow shank in the proper aligned position, the accessory shank is then inserted in the hitch receiver. When the two opposing apertures in the shank sidewalls align with two corresponding aligned apertures in the receiver hitch, a pin component that cooperates with the nut or block is inserted through the receiver apertures, shank apertures, and throughbore in the inner shank assembly's nut or block, firmly coupling the accessory shank to the hitch receiver.

However, these assemblies also have shortcomings. For example, each of the above-referenced methods have recognized shortcomings.

None of the methods are very effective in firmly retaining the inner shank assembly in aligned position within the hollow accessory shank, and some of the methods require a user to assemble multiple components.

Additionally, the known methods teach an inner shank assembly being retained within the lumen of a hollow hitch-mounted accessory shank by a component element of the inner shank assembly exerting compressed force outwardly between and against two opposing shank sidewalls. Consequently, the known devices and methods would be limited in use to a 4-sided, hollow hitch-mounted accessory shank.

The disclosure in this application is an advancement of the art and provides economic benefit by effectively resolving both shortcomings in a single assembly. It is an aspect of the present invention to provide improved elements and arrangements thereof that reduce or eliminate at least some of the drawbacks of the known devices and methods.

It is an aspect of the invention to provide a fastening device for the purposes described which is inexpensive, dependable, and fully effective in accomplishing its intended purposes.

These and other aspects of the present invention will become readily apparent upon further review of the following specification and drawings.

SUMMARY OF THE INVENTION

This application teaches a hitch accessory fastening and retaining device and method that innovatively utilizes magnetic force as a much more effective method of firmly cinching an inner shank assembly to a sidewall within the cavity of a 4-sided, hollow hitch-mounted accessory shank. In addition to providing an improved and more highly-effective method of firmly retaining an inner shank assembly in position within the cavity of a 4-sided, hollow, hitch-mounted accessory shank, the magnetic cinch-block fastening and retaining device described, illustrated and claimed in this application is not limited to use exclusively within a four-sided, hollow, hitch-mounted accessory shank, but, unlike the products of the current art and as an advancement of the current art, is designed for use with hitch-mounted accessory shanks comprising a 3-sided, U-shaped shank; a 2-sided, angle-iron-shaped shank; and even a single, flat-bar shank.

In another example according to the present disclosure, a magnetic cinch-block fastening and retaining device and method which firmly cinches itself to the shank of a hitch-mounted accessory by magnetic force emitted by a magnet contacting, attached to, recessed within, or part of a fastener or block which firmly cinches a hitch-mounted accessory shank within a vehicle's hitch receiver. The device includes a threaded cinch-block or non-threaded cinch-block, a magnet contacting, attached to, recessed within, or part of the threaded cinch-block or non-threaded cinch-block which is removably attached to a hitch-mounted accessory shank and a bolt or cinch-pin that cooperates with the fastener or block in coupling and cinching the accessory shank firmly within a vehicle's hitch receiver.

A hitch accessory magnetic fastening and retaining device comprises a block having an internally-threaded throughbore and configured to be removably attachable to a metallic hitch-mounted accessory shank by magnetic force emitted by at least one magnet contacting, attached to, recessed within, or part of the fastener or block. Hereinafter, the fastener or block will be referred to as a cinch-block.

The magnetic cinch-block fastening and retaining device may further include an elongated bolt or hitch pin (hereinafter referred to as a cinch-pin) comprising a first, proximal end; an elongated midsection; and a second, distal end. The proximal end may include a head that is larger in diameter than the elongated midsection and distal end. The head may be round; non-circular and shaped to engage a tool of a cooperating configuration; comprise a non-circular shaped blind-bore within its end surface and configured to engage a tool of a cooperating configuration; comprise both a non-circular and cylindrical-shaped end; or a combination of features and/or shapes. Additionally, the surface of the head may be smooth or comprise an enhanced-grip surface such as a knurled finish, or plastic or rubber grip. The elongated midsection may include an externally-threaded section configured to cooperatively engage the cinch-block's internally-threaded throughbore. The distal end may include a groove or throughbore for engaging a lock mechanism or hitch pin clip, such as an industry standard hitch pin clip.

Another hitch accessory magnetic cinch-block fastening and retaining device comprises a block having a non-threaded throughbore and configured to be removably attachable to a metallic hitch-mounted accessory shank by magnetic force emitted by a magnet(s) contacting, attached to, recessed within, or part of the cinch-block. The throughbore in the cinch-block may be of a circular or non-circular shape such as square or hexagonal. This magnetic cinch-block fastening and retaining device may further include an elongated bolt or cinch-pin comprising a first, proximal end; an elongated midsection; and a second, distal end. The proximal end may include a head that is larger in diameter than the elongated midsection and distal end. The head may be round, non-circular and shaped to engage a tool of a cooperating configuration, or comprise a non-circular shaped blind-bore within its end surface and configured to engage a tool of a cooperating configuration. The elongated midsection may include a section shaped and configured to cooperatively engage the cinch-block's throughbore. The elongated midsection may also include an external thread convolution extending outwardly towards the distal end for engaging a threaded nut. The distal end may include an external thread convolution and the distal end may further include a groove or throughbore for engaging a lock mechanism or hitch pin clip, such as one known in the art. This magnetic cinch-block fastening and retaining device further includes a fastener comprising an internally-threaded throughbore configured to engage the external threads of the elongated bolt or cinch-pin.

A method of the invention comprises placing a cinch-block having a throughbore and comprising a magnetic element against a metallic surface of a hitch-mounted shank accessory having a shank aperture wherein the cinch-block is attracted to the metallic surface. Utilizing moving force, the cinch-block's position is adjusted to a position wherein the cinch-block's throughbore is aligned with a shank's aperture wherein magnetic force retains the cinch-block in alignment and firmly against the shank's metallic surface. The accessory shank is then inserted into a vehicle's hitch receiver comprising aligned apertures in two opposing sidewalls until the shank's aperture aligns with a receiver aperture. A bolt or cinch-pin comprising an external threaded convolution can be inserted through a first receiver aperture, accessory shank aperture, cinch-block's throughbore engaging the throughbore, and extend through the receiver's second aligned aperture. A threaded fastener, clip, and/or lock can be attached to the bolt or cinch-pin.

BRIEF DESCRIPTION OF THE DRAWINGS

The invention will be described with reference to the following drawing figures, wherein like reference numbers identify like parts throughout.

DETAILED DESCRIPTION OF THE PREFERRED EMBODIMENTS

Figure 1:
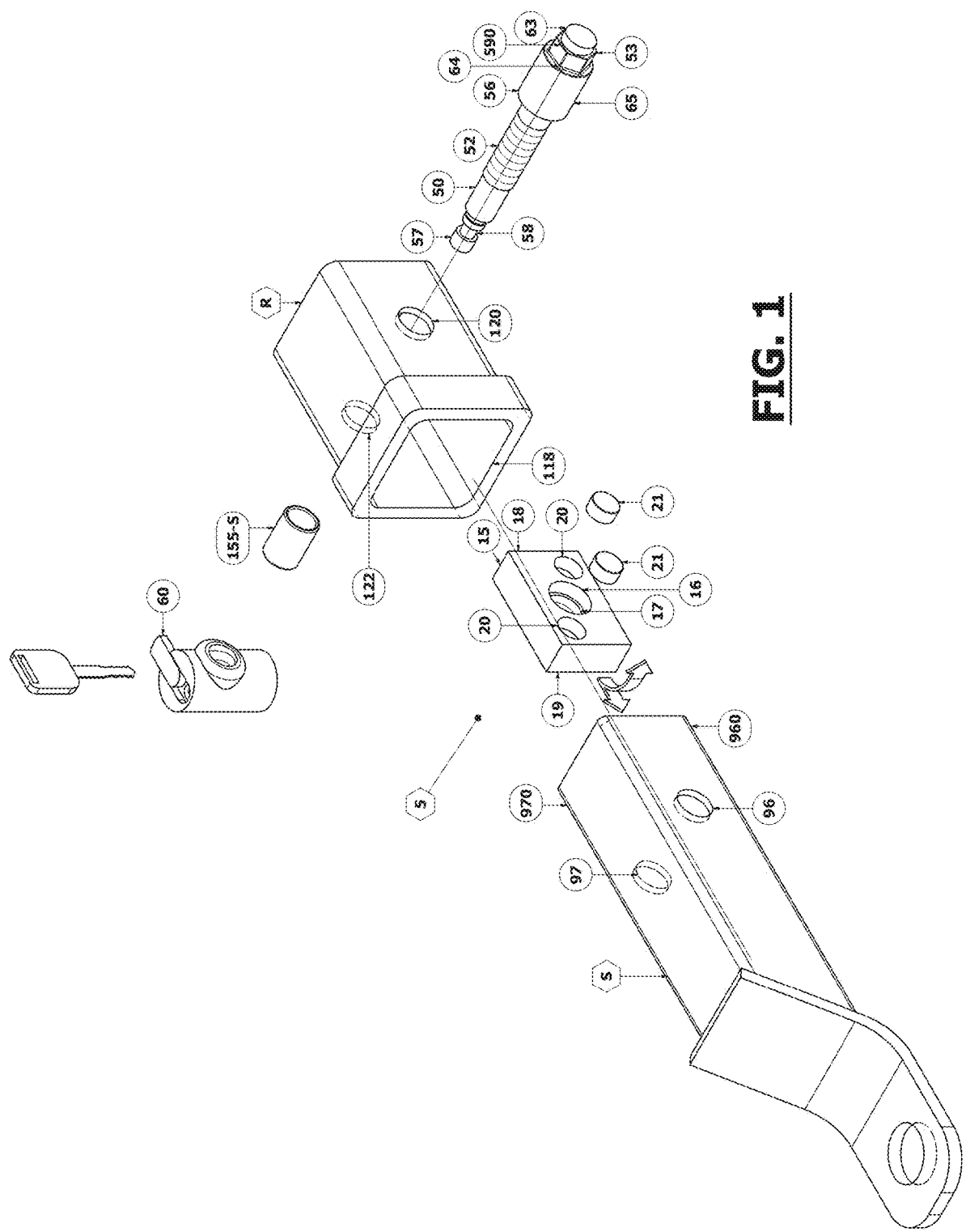
FIG. 1 is an exploded perspective view of an example of a magnetic cinch-block fastening and retaining device of the invention in combination with the shank of a hitch-mounted accessory and a receiver tube.

As used herein, spatial or directional terms, such as "top," "bottom," "left," "right," "over," "under," "front," "rear", "left", "right", "inner", "outer", "above", "below", and the like, relate to the invention as it is shown in the drawing figures. However, it is to be understood that the invention can assume various alternative orientations and, accordingly, such terms are not to be considered as limiting. Further, as used herein, all numbers expressing dimensions, physical characteristics, processing parameters, quantities of ingredients, reaction conditions, and the like, used in the specification and claims are to be understood as being modified in all instances by the term "about". Accordingly, unless indicated to the contrary, the numerical values set forth in the following specification and claims may vary depending upon the desired properties sought to be obtained by the present invention. At the very least, and not as an attempt to limit the application of the doctrine of equivalents to the scope of the claims, each numerical value should at least be construed in light of the number of reported significant digits and by applying ordinary rounding techniques. Additionally, all documents, such as but not limited to issued patents and patent applications, and all websites referred to herein, are to be considered to be "incorporated by reference" in their entirety.

The hitch accessory magnetic cinch-block fastening and retaining device and method described and illustrated in the drawings are intended to be illustrative and not exhaustive.

Figure 4:
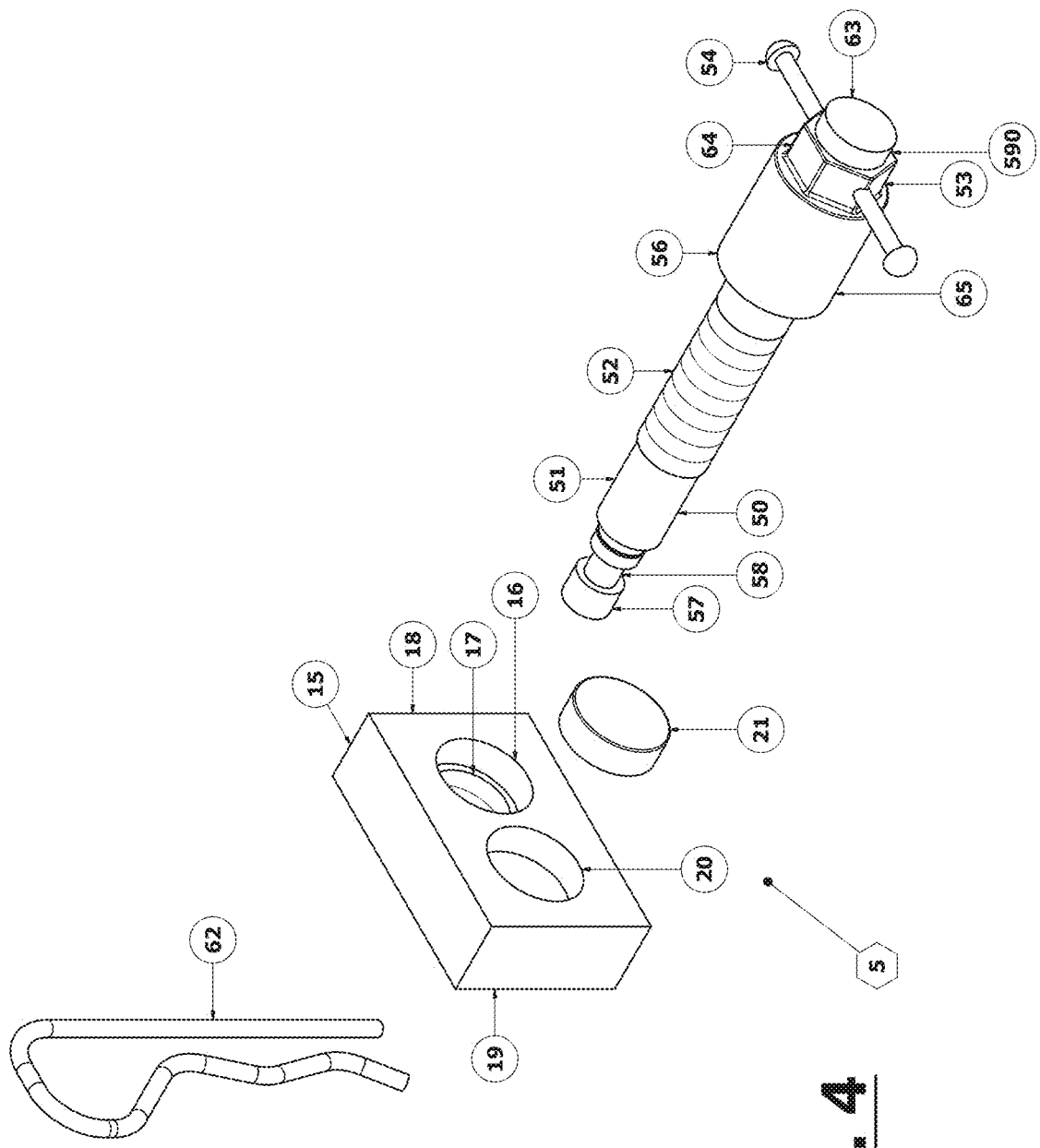
FIG. 4 is an exploded perspective view of another example of a magnetic cinch-block fastening and retaining device consistent with the present disclosure.

Referring to FIG. 1, there is shown a perspective view of a non-limiting embodiment of the inventive hitch accessory magnetic fastening and retaining device 5 and method. Hitch accessory magnetic fastening and retaining device 5 is comprised of cinch-block 15, cinch-pin 50, sleeve 155-S, and cinch-pin lock 60. Cinch-block 15 comprises a through-bore 16, which may have an internal threaded convolution 17. Cinch-block 15 has a first forward face side 18 and second rearward side 19. Cinch-block 15 further comprises two recesses 20 recessed within its forward face side 18 in which magnets 21 are housed. In examples, the recesses 20 may be blind bores, but in other embodiments the recesses 20 may be threaded. Cinch-block 15 is partially placed within hollow cavity of shank S with forward face side 18 facing first sidewall 960 of shank S comprising aperture 96 wherein magnetic force emitted from magnets 21 pulls cinch-block 15 against first sidewall 960 of shank S. Cinch-block 15 is moved into position wherein cinch-block throughbore 16 is aligned with shank aperture 96. With cinch-block 15 placed in position within accessory shank S and magnetically held in place against shank first sidewall 960, accessory shank S is inserted into hollow cavity 118 of receiver R. Shank S is further inserted into receiver R until aperture 96 in shank S becomes aligned with aperture 120 in receiver R. With accessory shank aperture 96 aligned with receiver aperture 120, cinch-pin 50 is inserted through receiver aperture 120, through aperture 96 of shank S, through cinch-block throughbore 16, through aperture 97 of shank S, and through aperture 122 of receiver R. When external threads 52 of cinch-pin 50 contacts cooperating internal thread convolution 17 in throughbore 16 of cinch-block 15, cinch-pin 50 is rotated to thread itself into cinch-block 15 pulling accessory shank S tight against the sidewall of receiver R and firmly securing shank S within receiver R. With cinch-pin 50 tightened securely, hollow sleeve 155-S is slid over cinch-pin distal end 57 until end of hollow sleeve 155-S abuts external threads 52 of cinch-pin 50 with opposed end of hollow sleeve 155-S extending through and protruding from aperture 122 of receiver R. A lock, such as cinch-pin lock 60, may then be attached to cinch-pin 50. Alternatively, in lieu of cinch-pin lock 60, a hitch pin clip 62 may be attached to cinch-pin distal end 57 as shown in FIG. 4.

It is to be understood that when used within a 4-sided, hollow, accessory shank as shown in FIG. 1, application of fastening and retaining device 5 according to the present disclosure may be used in the reverse direction as follows: cinch-block 15 may be placed within hollow cavity of shank S with forward face side 18 facing sidewall 970 of shank S comprising aperture 97 wherein magnetic force emitted from one or more magnet 21 pulls cinch-block 15 against sidewall 970 of shank S. Cinch-block 15 is moved and adjusted into position wherein cinch-block throughbore 16 is aligned with shank aperture 97. With cinch-block 15 seated in position within accessory shank S, accessory shank S inserted into hollow cavity 118 of receiver R. Shank S is further inserted into receiver R until aperture 97 in shank S becomes aligned with aperture 122 in receiver R. With accessory shank aperture 97 aligned with receiver aperture 122, cinch-pin 50 is inserted through receiver aperture 122, through aperture 97 of shank S, through cinch-block throughbore 16, through aperture 96 of shank S, and through aperture 120 of receiver R. When external threads 52 of cinch-pin 50 contacts cooperating internal thread convolution 17 in throughbore 16 of cinch-block 15, cinch-pin 50 is rotated to thread itself into cinch-block 15 pulling accessory shank S tight against the sidewall of receiver R and firmly securing shank S within receiver R. With cinch-pin 50 tightened securely, hollow sleeve 155-S is slid over cinch-pin distal end 57 until end of hollow sleeve 155-S abuts external threads 52 of cinch-pin 50 with opposed end of hollow sleeve 155-S extending through and protruding from aperture 120 of receiver R. Cinch-pin lock 60 may then be attached to cinch-pin 50. In various non-limiting examples, any of apertures 120, 122, 96, and/or 97 may be threaded or unthreaded.

Figure 2:
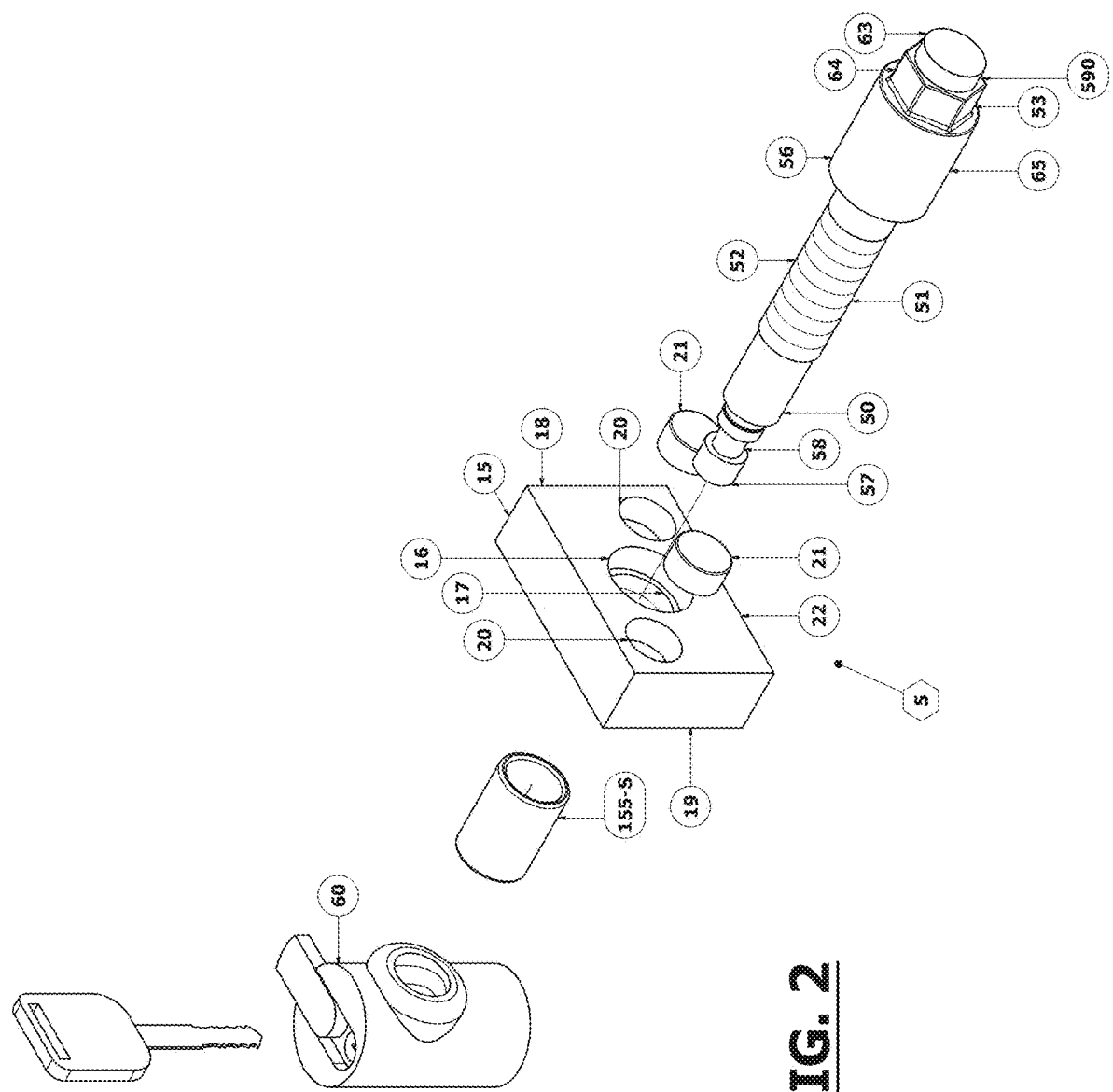
FIG. 2 is an exploded perspective view of an example of a magnetic cinch-block fastening and retaining device consistent with the present disclosure.

Referring to FIG. 2, there is shown an exploded perspective view of cinch-block 15 with cinch-pin 50. Cinch-block 15 has a first, forward face side 18 and second rearward side 19. As shown, cinch-block 15 further comprises dual recesses 20 recessed within its forward face side 18 in which magnets 21 are housed. As shown, recesses 20 are blind-bore cavities, and the number of cavities may correspond to the number of magnets 21 disposed in cinch-pin 15, however, it will be understood that the number of recesses 20 may be greater than the number of magnets 21. In examples, the recesses 20 may be positioned and/or numbered to affect the position of the center of mass of cinch-block 15. Blind-bore recesses 20 may be recessed within forward face side 18 of cinch-block 15 a depth equal to or slightly greater than the thickness of magnets 21. In examples, it may be preferable that when magnets 21 are placed within blind-bore recesses 20 the magnets are flush with or slightly recessed within forward face side 18 of cinch-block 15. Being flush with or slightly recessed within forward face side 18 of cinch-block 15, magnets 21 may be protected from being crushed, cracked, or damaged by compression resistance when forward face side 18 of cinch-block 15 is tightened firmly against shank S with cinch-pin 50.

Cinch-Block 15 may include a gritty-surfaced gasket (not shown) adhered to the forward face side 18 of cinch-block 15 to aid in retaining cinch-block 15 in position, and which coacts with the forward face side 18 of cinch-block 15, and the shank S.

Figure 3:
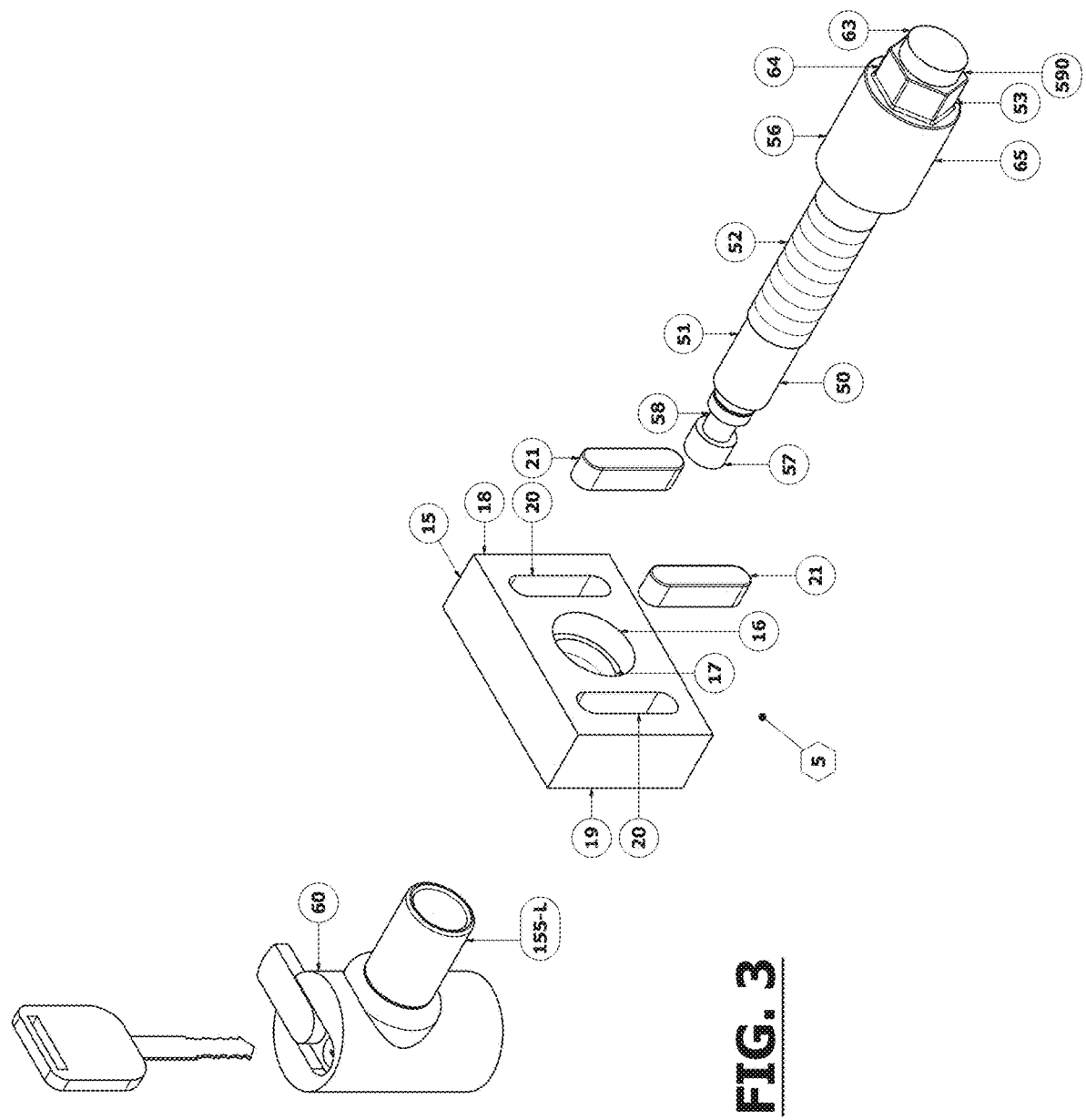
FIG. 3 is an exploded perspective view of another example of a magnetic cinch-block fastening and retaining device consistent with the present disclosure.

With further reference to FIGS. 2 and 3, cinch-pin 50 is comprised of a first, proximal end 53; an elongated shank midsection 51; and a second, distal end 57. The proximal end 53 may include a head 65 that is larger in diameter than the elongated midsection, and forming flange 56. A portion 64 of the proximal end head 65 may be configured in a non-circular shape (shown in a non-limiting example in FIG. 2 as hexagonal) to engage a tool of a cooperating configuration for tightening cinch-pin 50 to a desired amount of torque. Proximal end head 65 may further include, from non-circular portion 64 to the outermost end of head 65, a cylindrical-shaped end 63, forming flat flange 590 at the transition point between portion 64 and end 63. The elongated shank midsection 51 comprises external threads 52 that cooperates with internal thread convolution 17 in throughbore 16 of cinch-block 15. Distal end 57 may include groove 58 for engaging lock 60 or hitch pin clip 62 (shown in FIG. 4). In lieu of groove 58 on cinch-pin 50 distal end 57, distal end 57 may contain a throughbore 59 (shown in FIG. 15) for engaging hitch pin clip 62 (shown in FIGS. 4 and 15).

With further reference to FIGS. 1 and 2, when cinch-pin 50 is inserted through a first receiver aperture 120, accessory shank aperture 96, cinch-block's throughbore 16 and receiver's second aligned aperture 122, cinch-pin 50 is rotated to thread itself into cinch-block 15 pulling accessory shank S tight against the inside sidewall of receiver R. Flange 56 may contact the outside sidewall of receiver R creating compression resistance, firmly securing shank S within receiver R as cinch-pin 50 is further rotated to a desired amount of torque. With cinch-pin 50 tightened securely, hollow sleeve 155-S may be slid over cinch-pin distal end 57, wherein a first end of hollow sleeve 155-S abuts external threads 52 of cinch-pin 50, and an opposing end of hollow sleeve 155-S extending through and protruding from receiver's second aligned aperture. Cinch-pin lock 60 or hitch pin clip 62 (shown in FIG. 4), may then be attached to cinch-pin 50, resulting in a hitch accessory magnetic cinch-block fastening and retaining device and method that cinches a hitch-mounted accessory shank firmly to a vehicle's hitch receiver.

Recognizing that there are numerous shapes, sizes, and types of magnets, the scope of this invention is not limited to use of a specific size, shape, or type of magnet, but variations in magnet type, size and shape for use are contemplated and considered within the scope of this invention. In addition, the scope of this invention is not limited to use of two magnets nor a single method used to attach magnet or magnets 21 directly or indirectly to cinch-block 15, but variations in the number of magnets utilized and methods of attaching one or more magnets to cinch-block 15 are considered within the scope of this invention. Additionally, recognizing that there are various shapes, sizes and types of hitch pin locks, the scope of this invention is not limited to use of a specific size, shape, or type of cinch-pin lock, but variations in cinch-pin lock type, size and shape for use are contemplated and considered within the scope of this invention as a matter of design choice. Therefore, it should be understood that the present invention is not limited to the selective embodiments described and illustrated, and due to the number of variations in design choice, the embodiments shown and described are intended to be an illustrative representation of embodiments and not an exhaustive representation of embodiments.

Referring to FIG. 3, cinch-block 15 is shown with two oblong blind bore recesses 20 and magnets 21. This embodiment also shows sleeve 155-L as a component of cinch-pin lock 60, rather than a separate, stand-alone sleeve as shown in the FIGS. 1 and 2. Magnets 21 may be affixed within recesses 20 by adhesive, mechanical fastening, or other manners known in the art. While FIG. 3 shows magnets 21 positioned to laterally flank throughbore 16, it is to be understood that recesses 20 may be positioned in other configurations on cinch-block 15, and magnets 21 positioned in one or more of recesses 20. It also is to be understood that, in examples, one or more magnets 21 may be positioned directly on forward face surface 18 without recesses 20. In such a configuration, the thickness of cinch-block 15 may be changed to fit within shank S.

Figure 5:
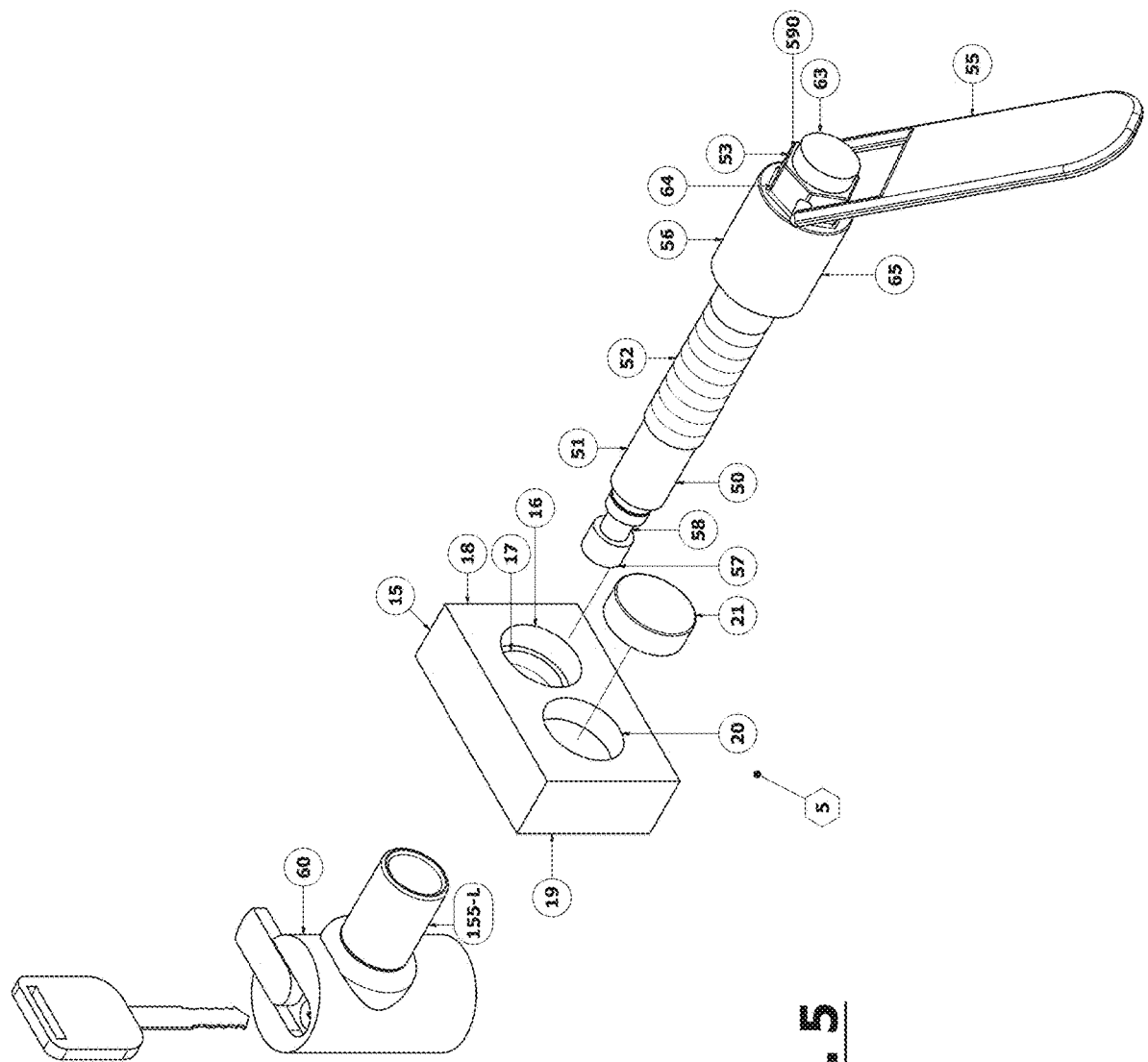
FIG. 5 is an exploded perspective view of another example of a magnetic cinch-block fastening and retaining device consistent with the present disclosure.
Figure 6:
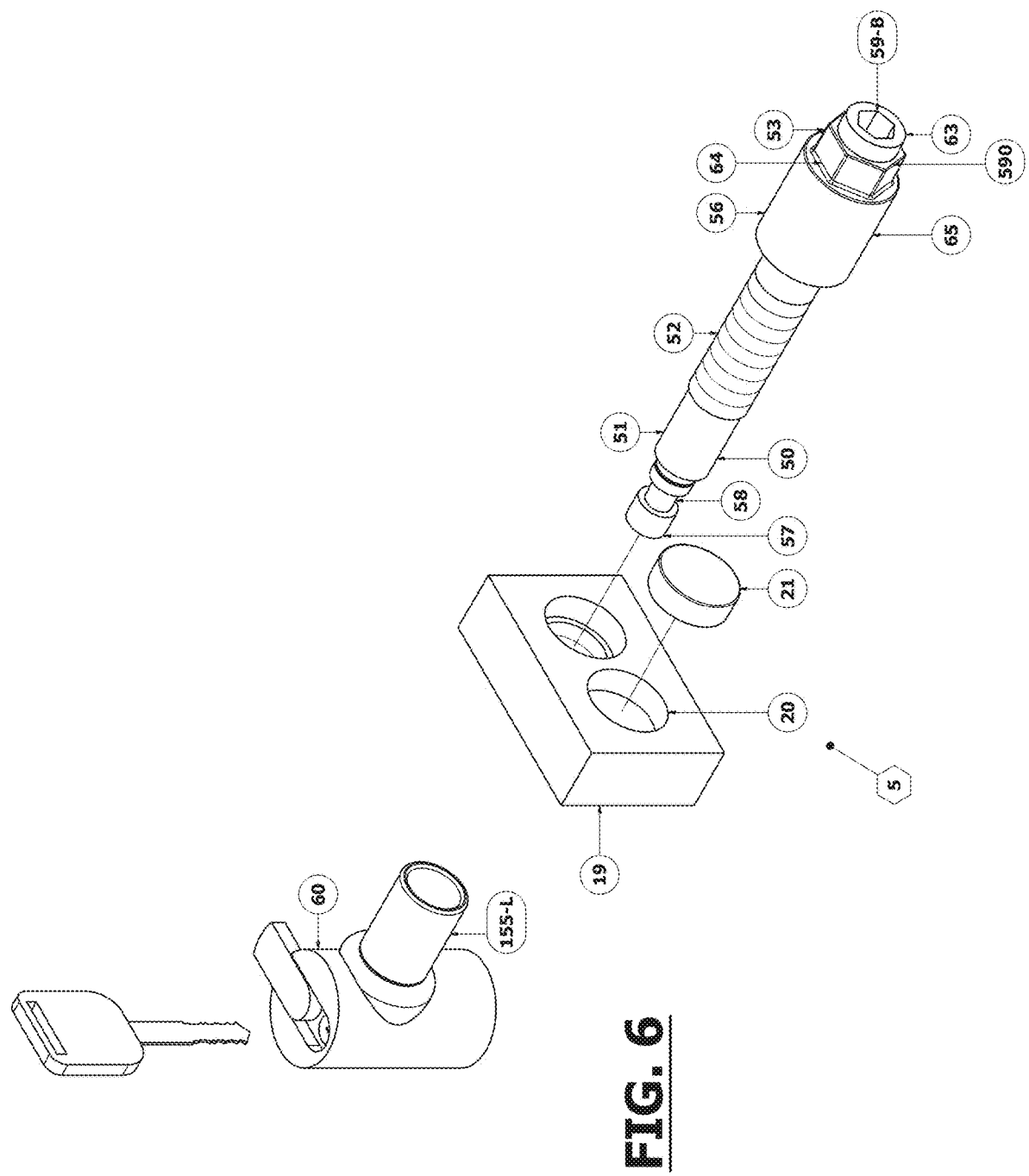
FIG. 6 is an exploded perspective view of another example of a magnetic cinch-block fastening and retaining device consistent with the present disclosure.

Additionally, proximal end 53 of cinch-pin 50 may be modified and configured to aid in threading and firmly tightening cinch-pin 50. Some illustrative configuration examples, which are not intended to be exhaustive, are shown in FIGS. 4, 5, and 6. FIG. 4 shows a cinch-pin 50 including an adjustable T-handle 54 on proximal end 53. FIG. 4 also shows an embodiment of cinch-block 15 comprising a single blind bore recess 20 and single magnet 21, along with the use of hitch pin clip 62 in lieu of cinch-pin lock 60. FIG. 5 shows a cinch-pin 50 including a swivelable L-shaped handle 55 on proximal end 53. FIG. 6 shows a cinch-pin 50 including a hexagonal blind bore cavity 59-B within the end of proximal end 53, configured to coact with a tool (not shown). While each of the foregoing features is depicted together in FIGS. 4-6, it is to be understood that each may be used in other examples of the present invention as well.

Referring to FIGS. 7 through 19, there are shown some non-exhaustive, illustrative examples variations in magnet size, shape, placement and method of magnet placement in/or cinch-block 15, consistent with the presently-disclosed invention.

Figure 7:
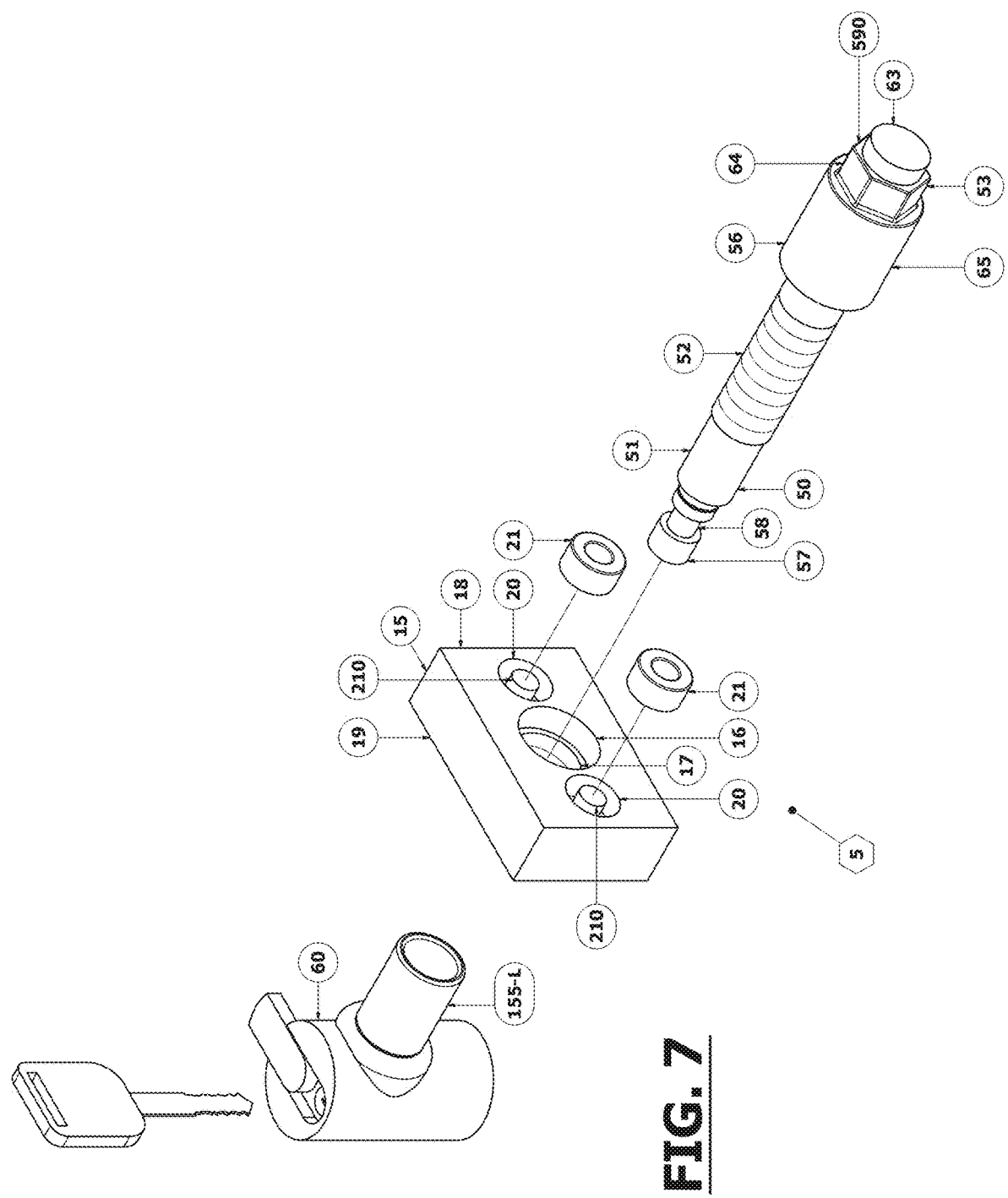
FIG. 7 is an exploded perspective view of another example of a magnetic cinch-block fastening and retaining device consistent with the present disclosure.

FIG. 7 shows an example consistent with the present disclosure including two ring-shaped magnets 21 recessed within 2 ring-shaped blind-bore recesses 20 in cinch-block 15. As shown, blind bore recesses 20 have a ring shape which corresponds to the ring shape of magnets 21. The centers of recesses 20 may form flanges 210, which may be configured to coact with ring-shaped magnets 21 to support magnets 21. The flanges 210 may be flush with the surface of forward face side 18. Ring-shaped magnets 21 may be positioned within the recesses 20 such that the magnets 21 do not extend beyond the surface of forward face side 18 of cinch-block 15. In examples, the centers may provide additional protection to magnets 21 from damage from compression forces when forward face side 18 of cinch-block 15 encounters compression resistance when tightening shank S to receiver R sidewall.

Figure 8:
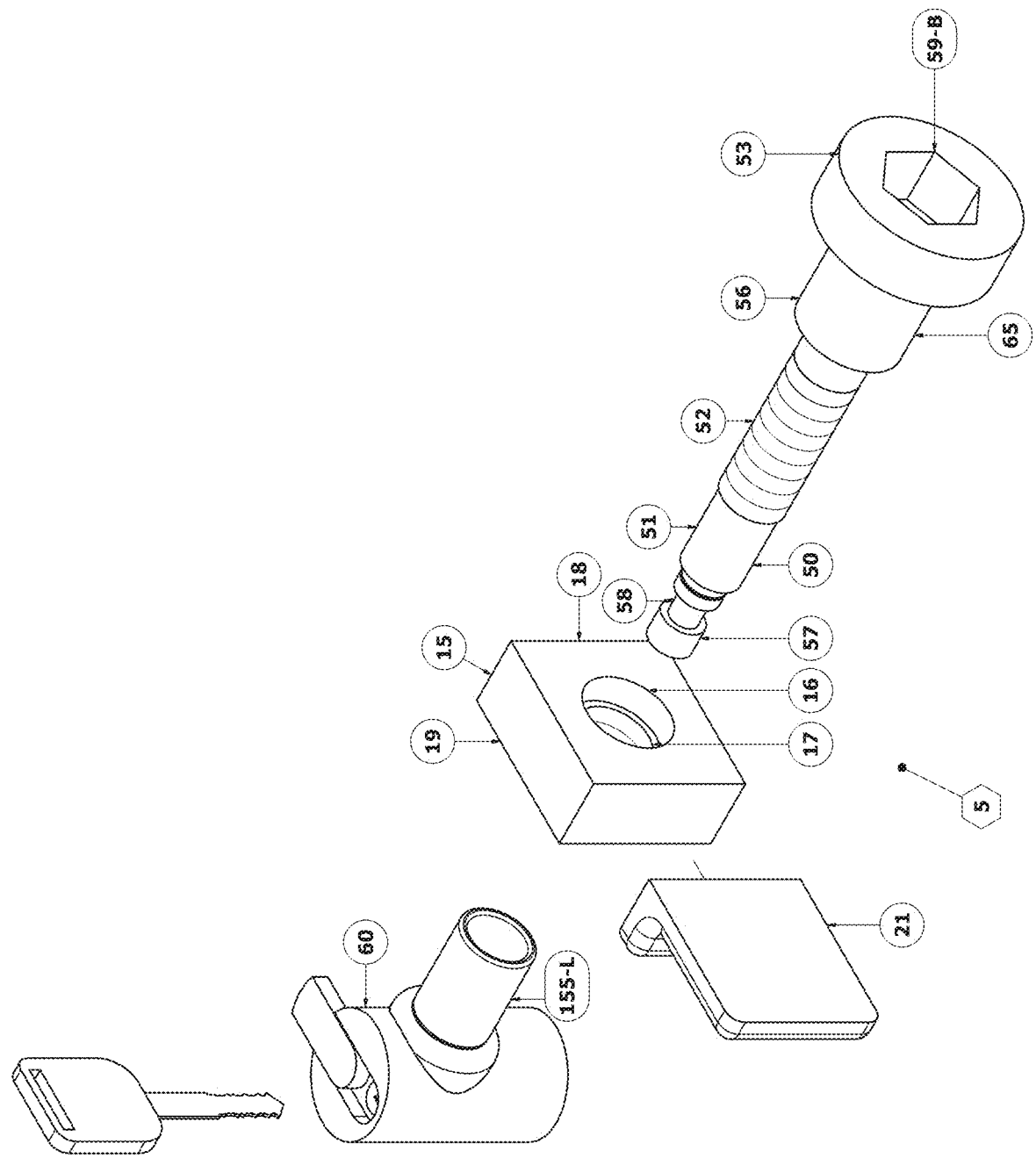
FIG. 8 is an exploded perspective view of another example of a magnetic cinch-block fastening and retaining device consistent with the present disclosure.

FIG. 8 shows an L-shaped magnet 21 attached to cinch-block 15. Magnet 21 may be integrally formed with cinch-block 15, or may be affixed to cinch-block 15 by adhesive, mechanical fastening, or other manners known in the art. According to the non-limiting example of FIG. 8, the center of mass of cinch-block 15 may not be positioned in throughbore 15. In examples, the dimensions of cinch-block 15 and/or magnet 21 may prevent the cinch-block 15 from rotating as cinch-pin 50 is tightened. As shown in FIG. 8, the surface of magnet 21 may be coextensive with the surface of front face side 18 of cinch-block 15.

FIGS. 9 through 12 show magnet 21 being indirectly attached to cinch-block 15 by use of a bracket 70 contacting, attached to, or made part of cinch-block 15.

Figure 9:
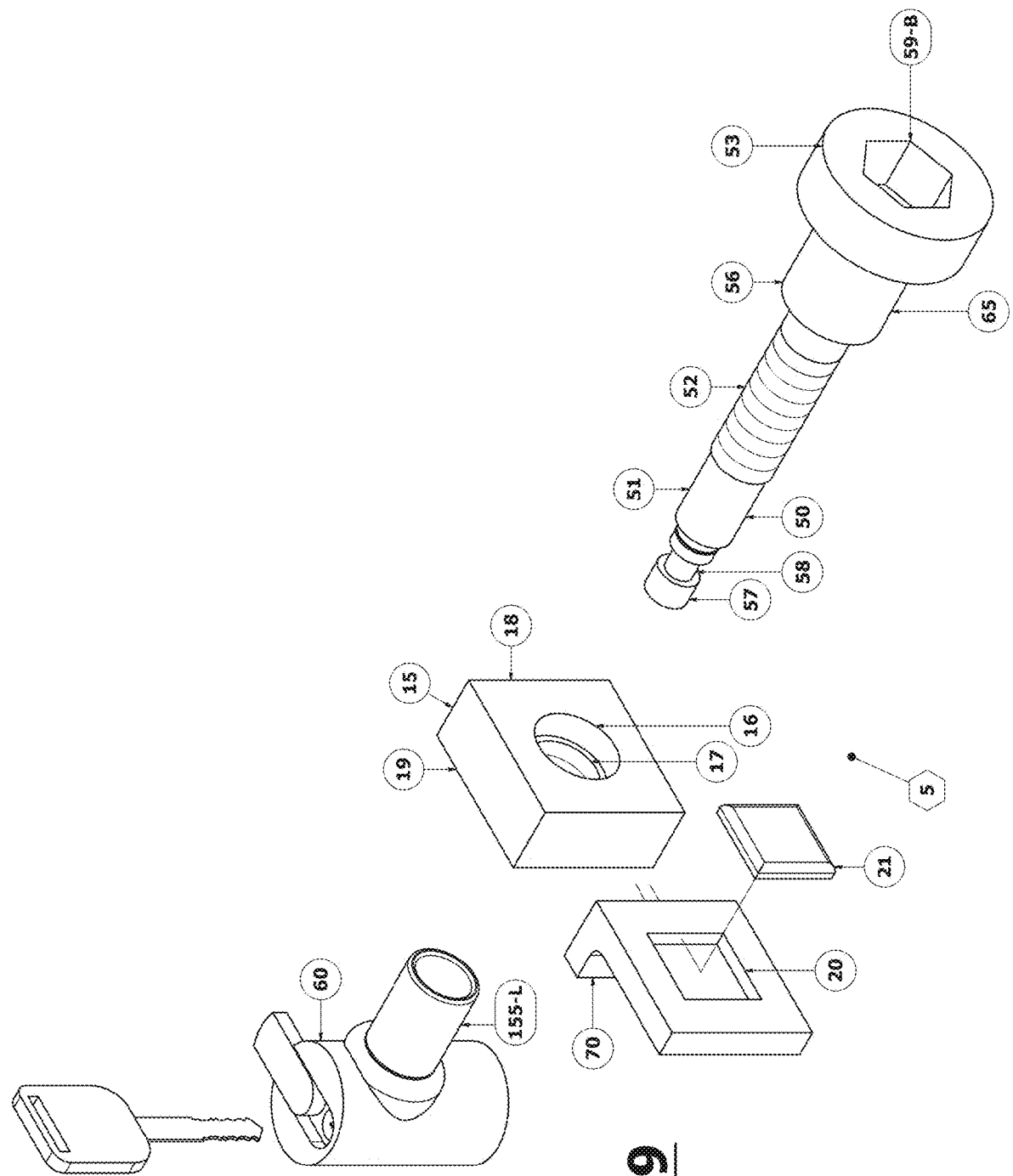
FIG. 9 is an exploded perspective view of another example of a magnetic cinch-block fastening and retaining device consistent with the present disclosure.

FIG. 9 shows an example of a square-shaped magnet 21 being indirectly attached to cinch-block 15 by use of a bracket 70 housing magnet 21 and bracket 70 attached to cinch-block 15. Examples of bracket 70 may be integral to cinch-block 15, or affixed to cinch block 15 by adhesive, mechanical fastening, or other manners known in the art. It is to be understood that magnet 21 may comprise other shapes, such as circular or ring-shaped. In examples, the dimensions of cinch-block 15 and/or bracket may prevent the cinch-block 15 from rotating as cinch-pin 50 is tightened. As shown in FIG. 9, the surface of magnet 21 and/or bracket 70 may be coextensive with the surface of front face side 18 of cinch-block 15.

Figure 10:
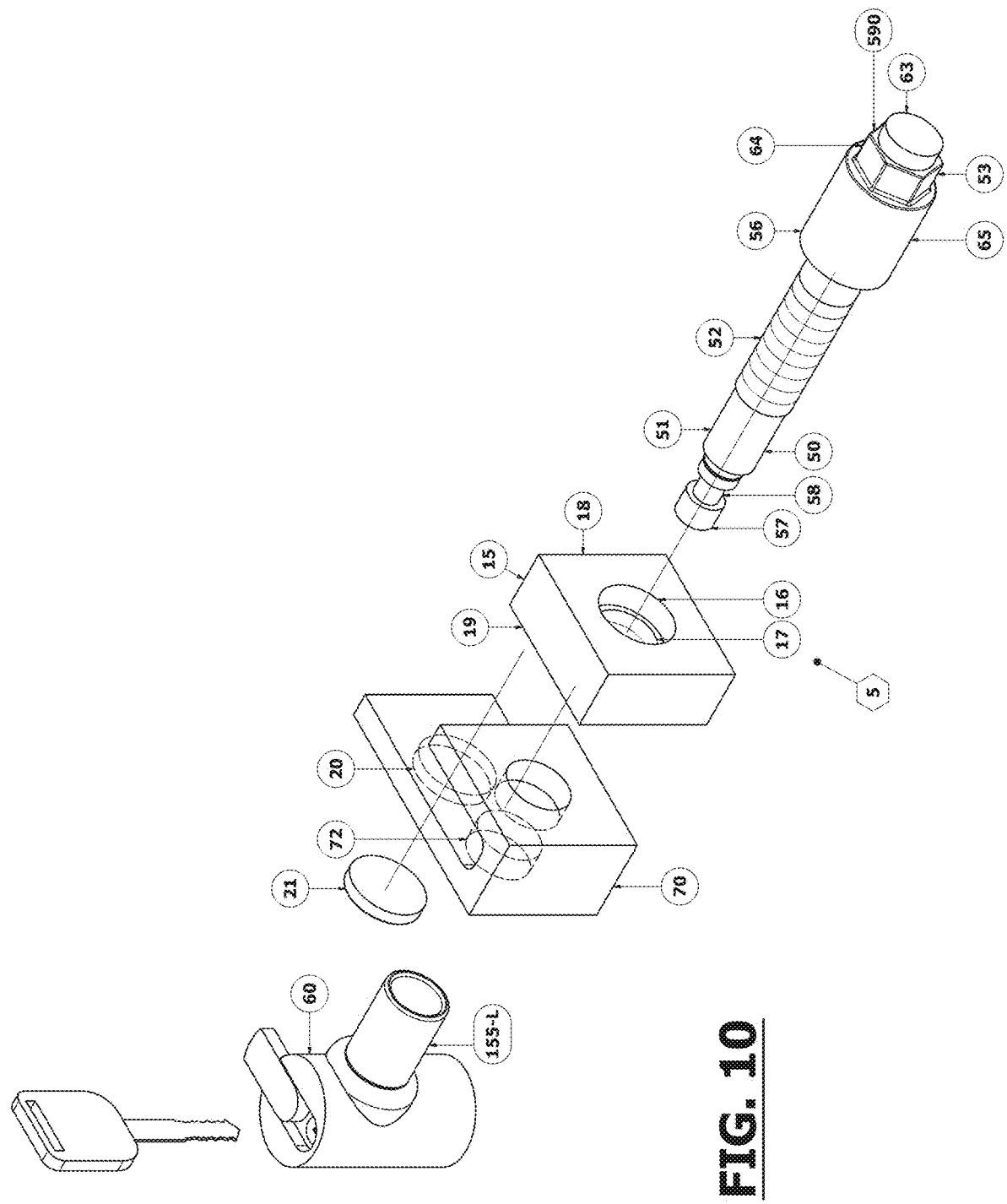
FIG. 10 is an exploded perspective view of another example of a magnetic cinch-block fastening and retaining device consistent with the present disclosure.

FIG. 10 shows magnet 21 being indirectly attached to cinch-block 15 by use of a bracket 70 housing magnet 21 and configured to contact rearward side 19 of cinch-pin 15. Bracket 70 is shown with throughbore 72 for cinch-pin 50 to pass through when engaging cinch-block 15. It is to be understood that one or more magnet 21 may be disposed on bracket 70 in one or more recess 20, or on the surface of bracket 70. Bracket 70 may include one or more throughbores 72 aligned with throughbore 16 of cinch-pin 15, and configured to receive cinch-pin 50. In examples, the inner surface of the one or more throughbores 72 may be threaded, or may be unthreaded in other examples. Examples of bracket 70 may be positioned to provide added stability of cinch-block 15 when cinch-block 15 is positioned within the shank S. Examples of bracket 70 may be a separate piece from cinch-block 15, or may be integral to cinch-block 15, or affixed to cinch block 15 by adhesive, mechanical fastening, or other manners known in the art.

Figure 11:
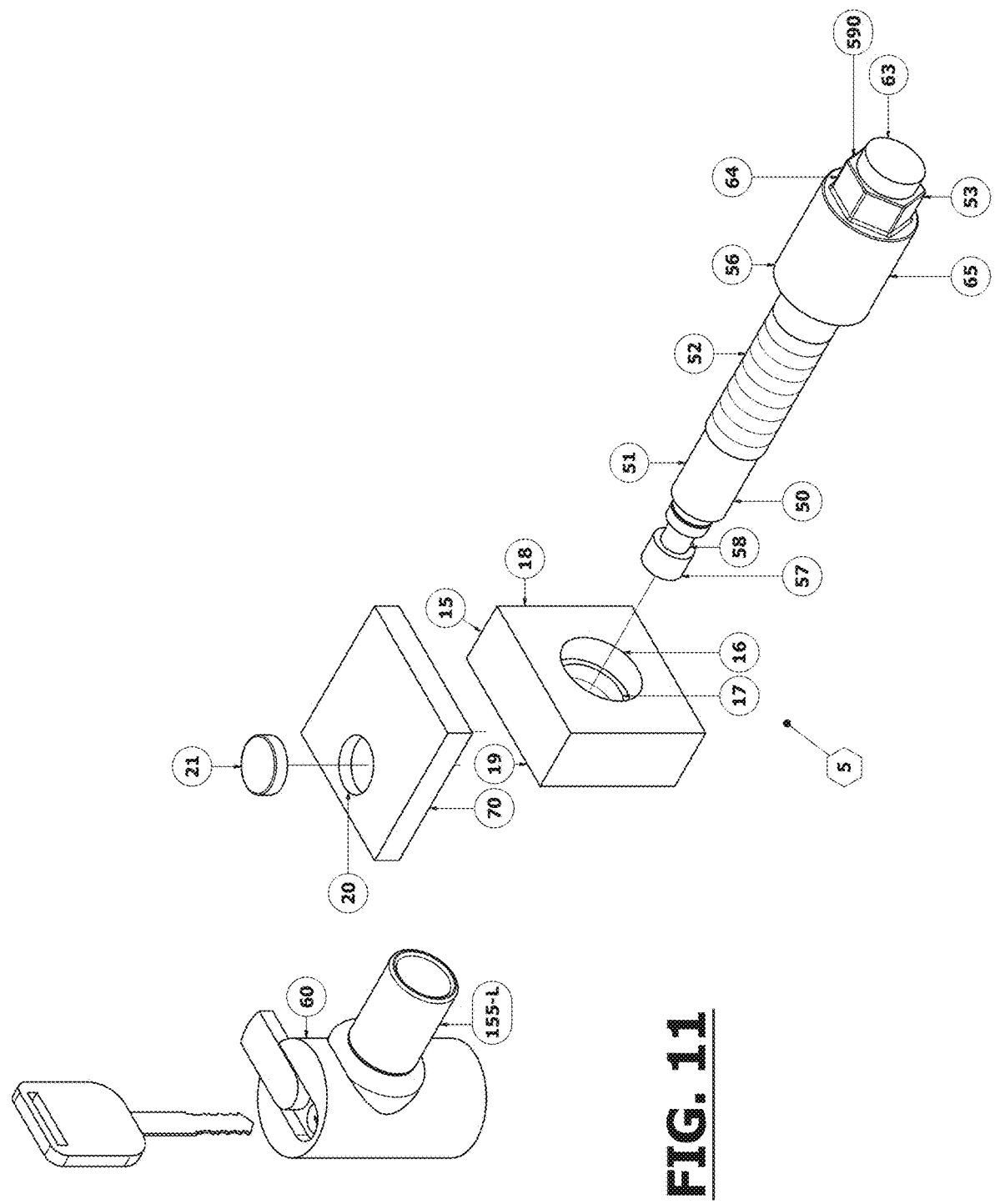
FIG. 11 is an exploded perspective view of another example of a magnetic cinch-block fastening and retaining device consistent with the present disclosure.

FIG. 11 shows magnet 21 being indirectly attached to cinch-block 15 with magnet 21 attached to bracket 70 and bracket 70 attached to cinch-block 15 wherein magnetic force is applied to a shank sidewall adjacent to shank sidewall comprising aperture 96 or 97. Examples of bracket 70 may be a separate piece from cinch-block 15, or may be integral to cinch-block 15, or affixed to cinch block 15 by adhesive, mechanical fastening, or other manners known in the art.

Figure 12:
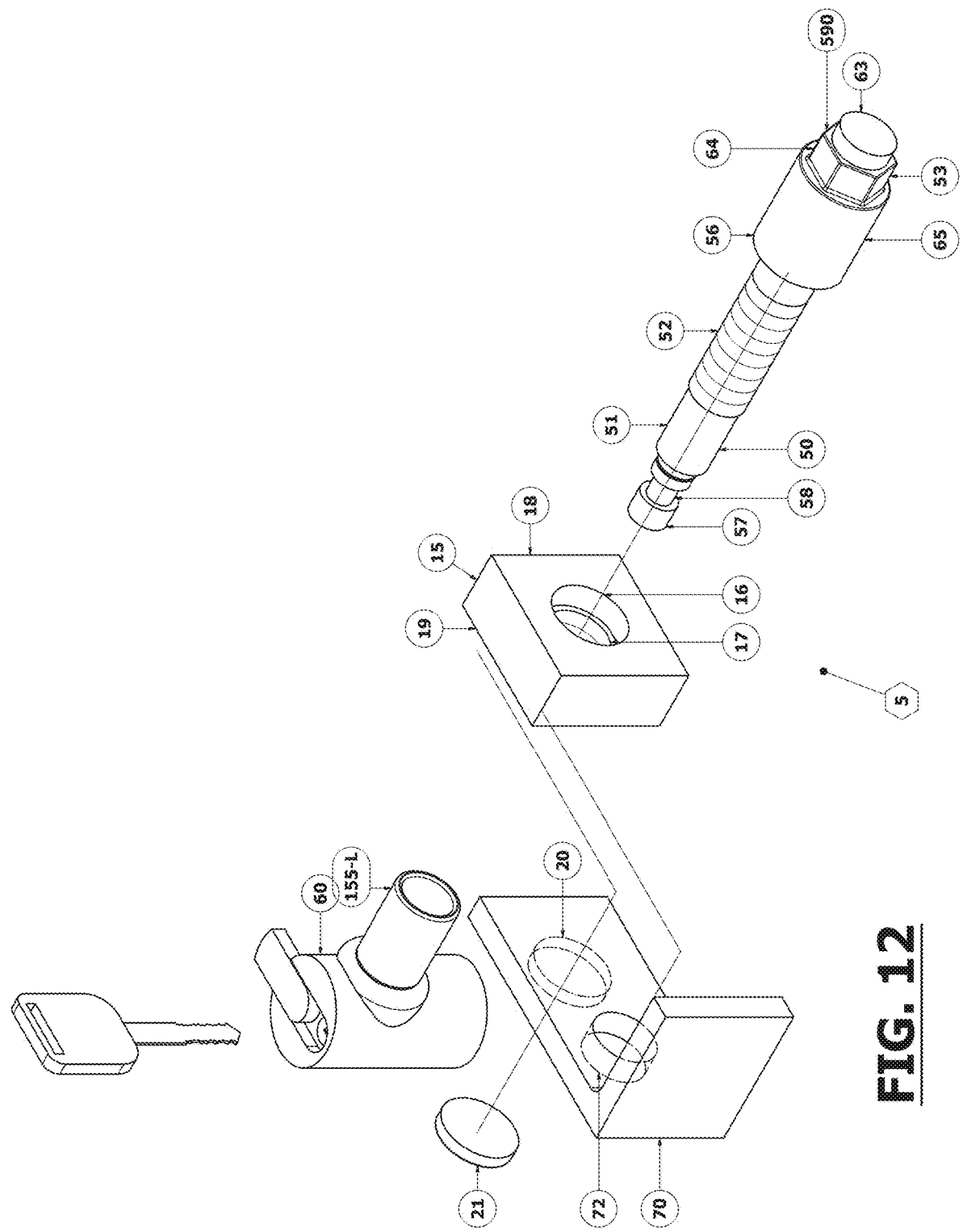
FIG. 12 is an exploded perspective view of another example of a magnetic cinch-block fastening and retaining device consistent with the present disclosure.

FIG. 12 shows magnet 21 being indirectly attached to cinch-block 15 with magnet 21 attached to bracket 70 and bracket 70 attached to cinch-block 15 wherein magnetic force is applied to a shank sidewall opposite shank sidewall contacting cinch-block 15. Bracket 70 is shown with throughbore 72 for cinch-pin 50 to pass through when engaging cinch-block 15. Examples of bracket 70 may be a separate piece from cinch-block 15, or may be integral to cinch-block 15, or affixed to cinch block 15 by adhesive, mechanical fastening, or other manners known in the art.

Figure 13:
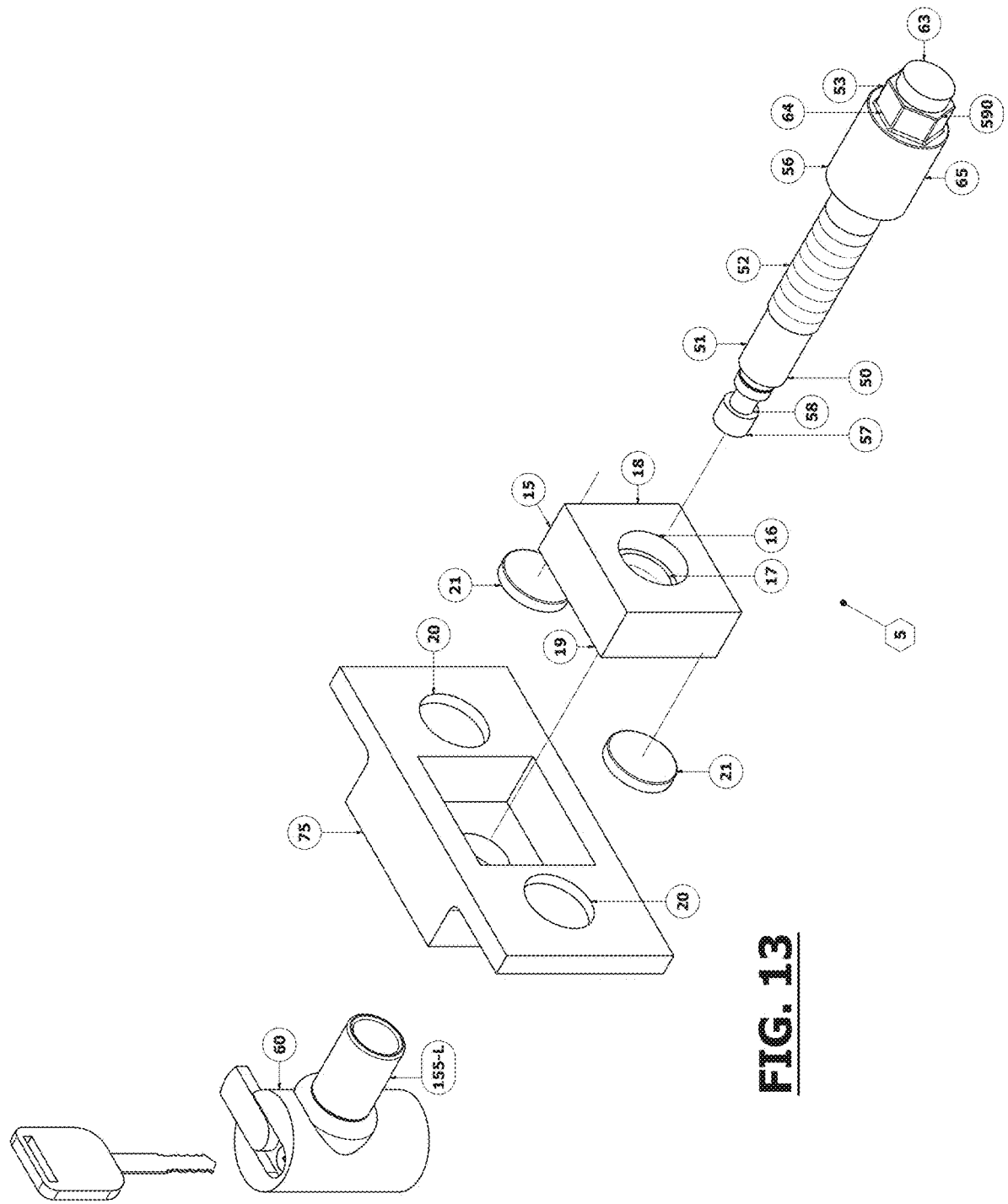
FIG. 13 is an exploded perspective view of another example of a magnetic cinch-block fastening and retaining device consistent with the present disclosure.

FIG. 13 shows two magnets 21 being indirectly attached to cinch-block 15 by use of a shroud 75 that covers cinch-block 15. Examples of shroud 75 may be a separate piece from cinch-block 15, or may be integral to cinch-block 15, or affixed to cinch block 15 by adhesive, mechanical fastening, or other manners known in the art. Examples of shroud 75 may be positioned to provide added stability of cinch-block 15 when cinch-block 15 is positioned within the shank S. In examples, a surface of shroud 75 and/or the magnets 21 may be coextensive with the surface of front face side 18 of cinch-block 15 when cinch block 15 is positioned within the shroud.

Figure 14:
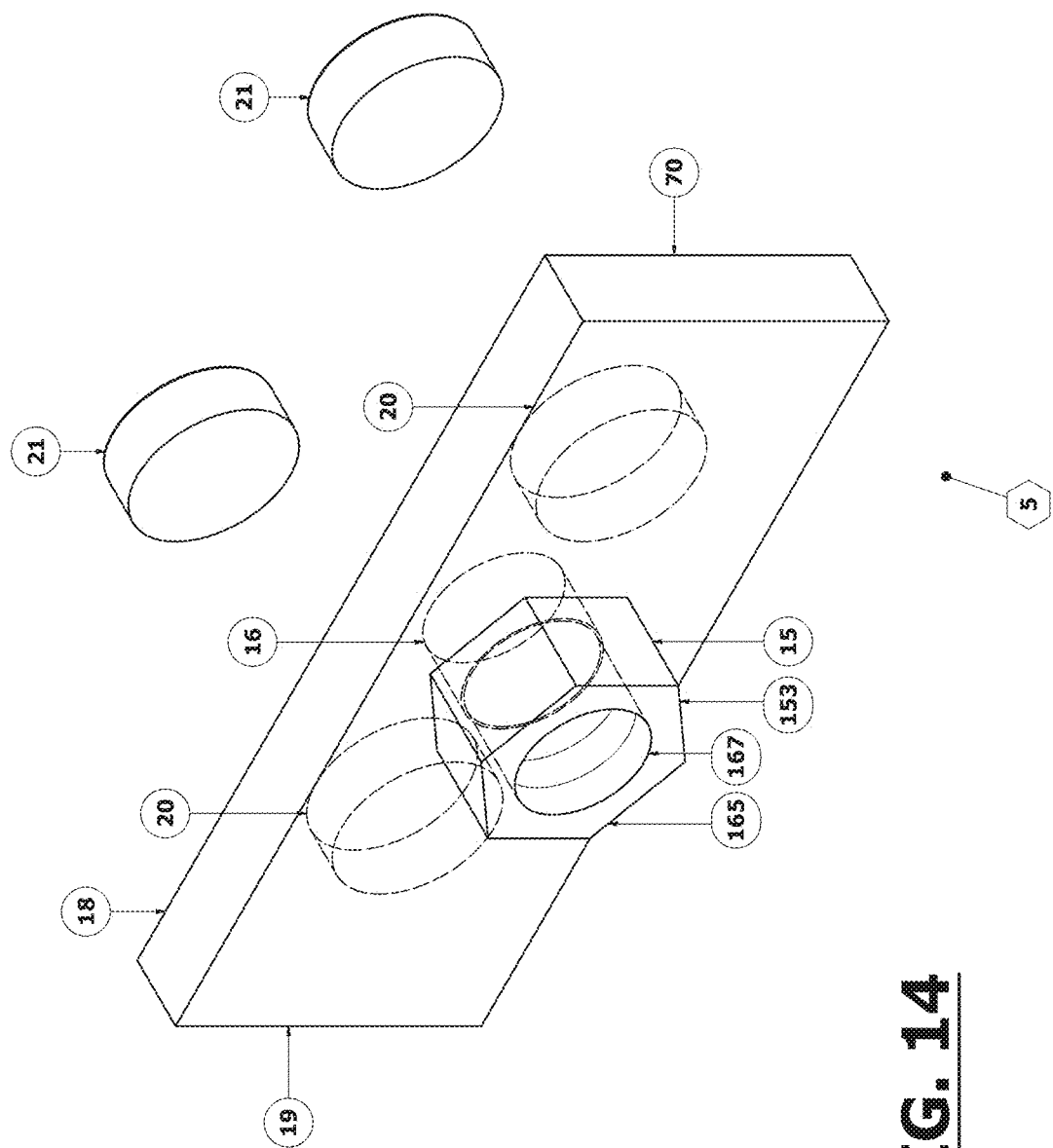
FIG. 14 is an exploded perspective view of an example of a cinch-block consistent with the present disclosure.

FIG. 14 shows magnet 21 being indirectly attached to an example of a cinch-block 15 by use of a bracket 70, which houses magnets 21. In this example, cinch-block 15 is comprises an internally-threaded 167 hexagonal-shaped fastener 165 attached to bracket 70 with bracket 70 housing magnets 21. In this example, cinch-block 15, 165 is attached to bracket 70 in a stationary position to prevent cinch-block 15/165 from rotating when cinch-pin 50 is threaded in and tightened to cinch-block 15, 165. Cinch-block 15, 165 may be affixed in a stationary manner to bracket 70 by adhesive, mechanical fastening, welding, or other manners known in the art.

Figure 15:
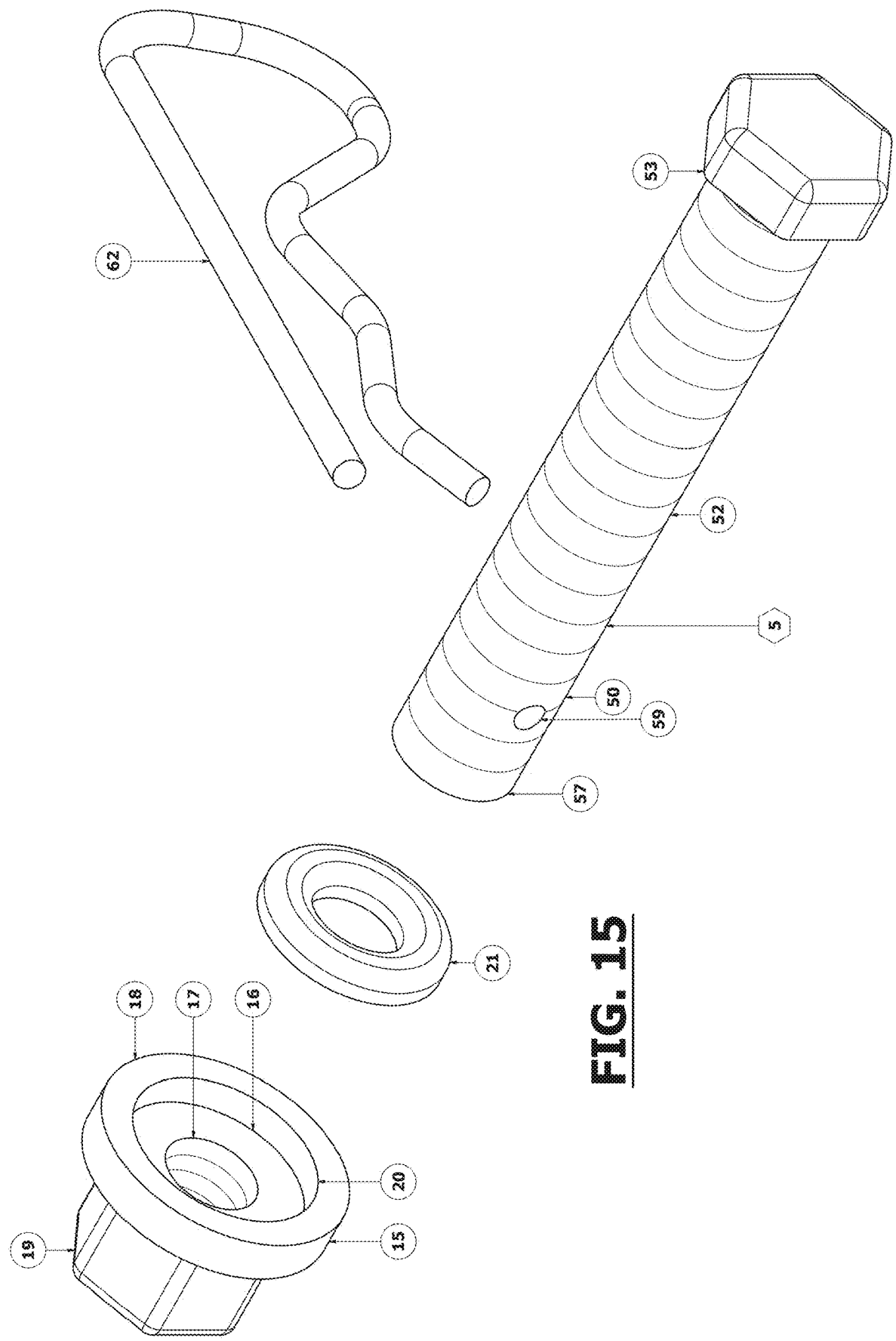
FIG. 15 is an exploded perspective view of yet another example of a magnetic cinch-block fastening and retaining device consistent with the present disclosure.
Figure 16:
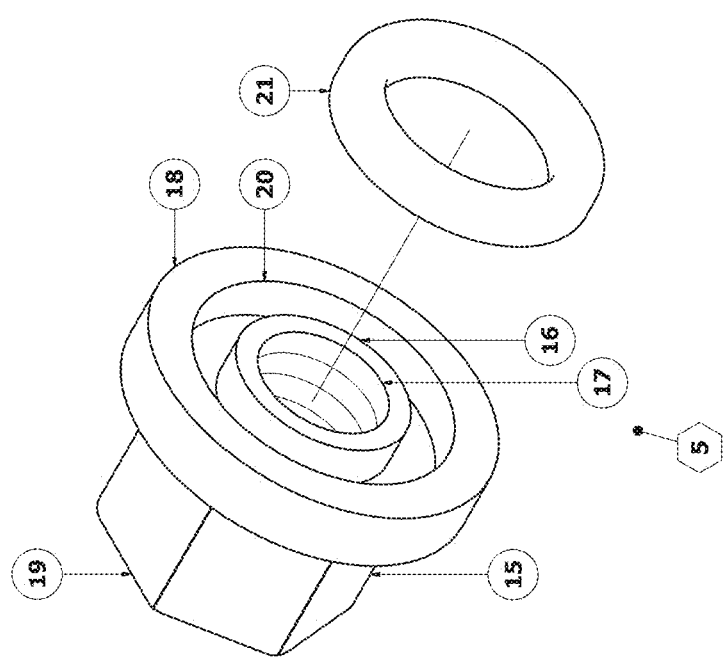
FIG. 16 is an exploded perspective view of another example of a cinch-block consistent with the present disclosure.
Figure 17:
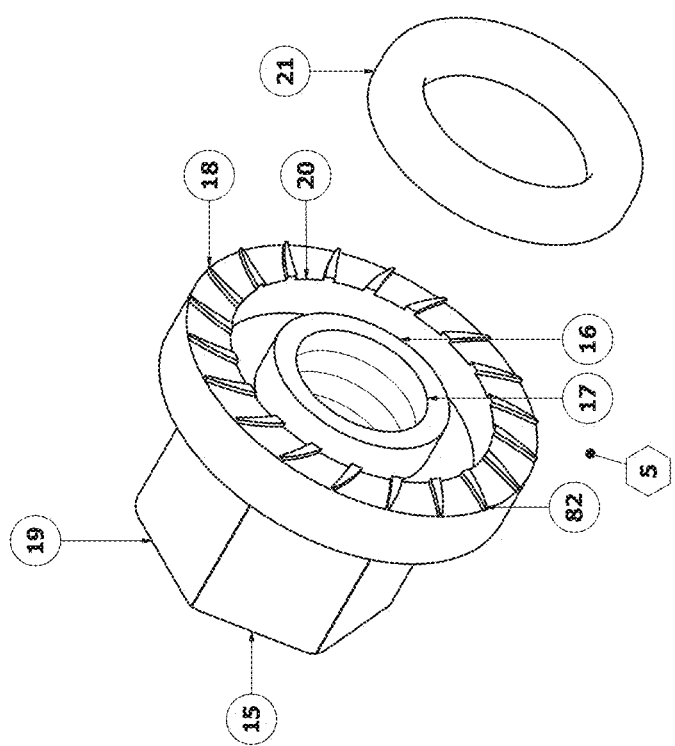
FIG. 17 is an exploded perspective view of yet another example of a cinch-block consistent with the present disclosure.
Figure 20:
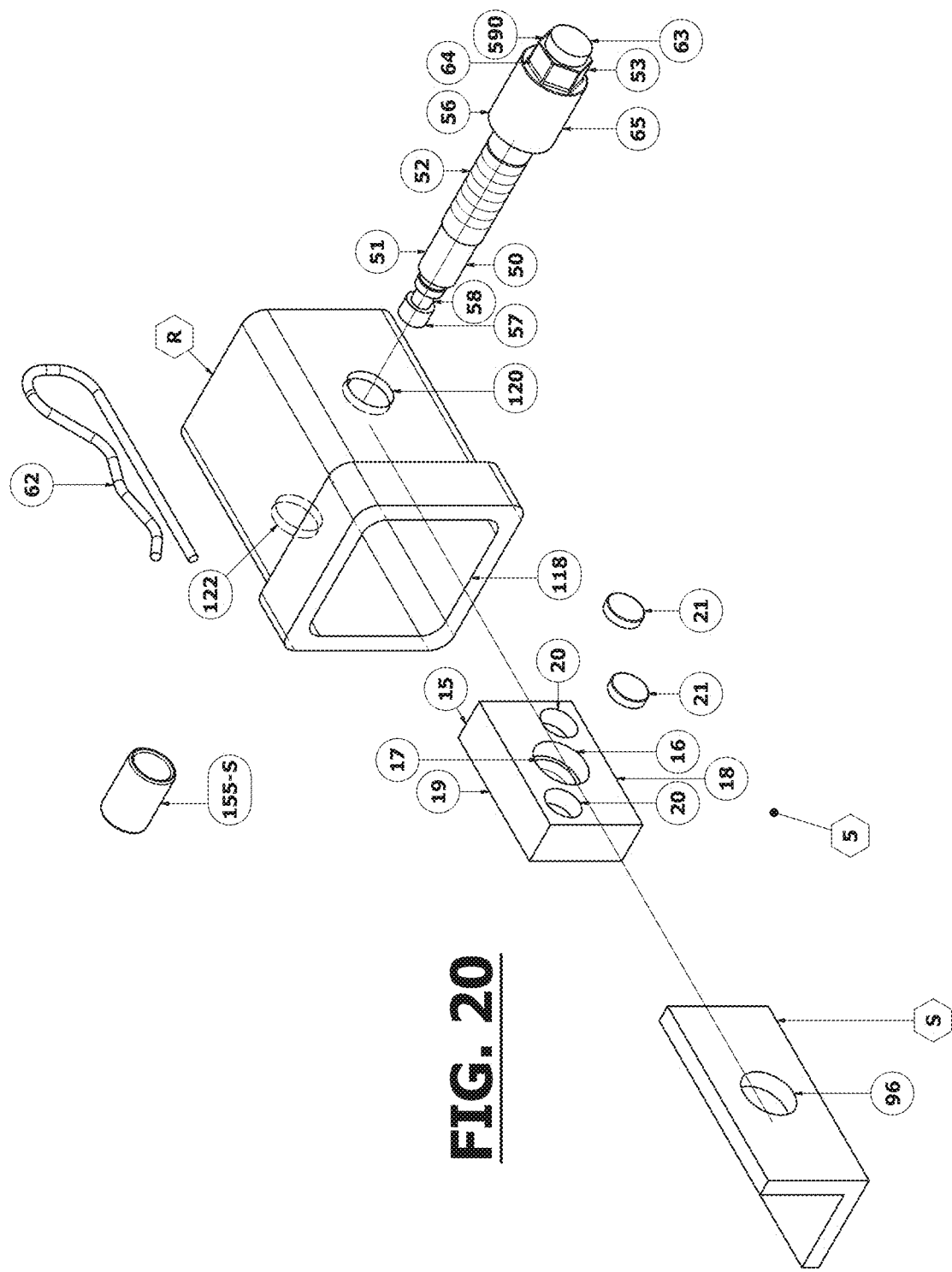
FIG. 20 is an exploded perspective view of another example of a magnetic cinch-block fastening and retaining device according to the present disclosure in combination with the shank of a hitch-mounted accessory and a receiver tube.
Figure 21:
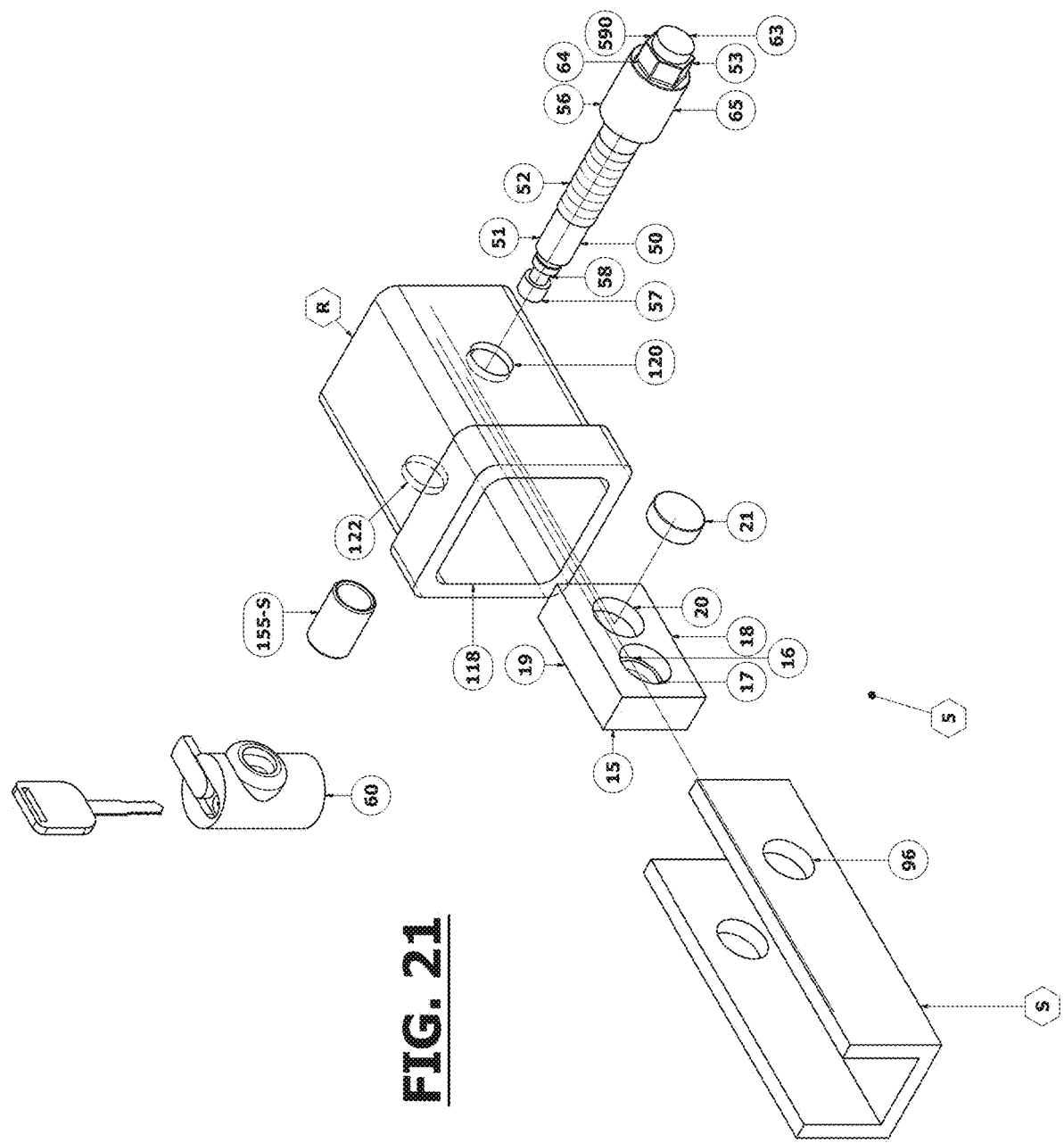
FIG. 21 is an exploded perspective view of yet another example of a magnetic cinch-block fastening and retaining device according to the present disclosure in combination with the shank of a hitch-mounted accessory and a receiver tube.
Figure 22:
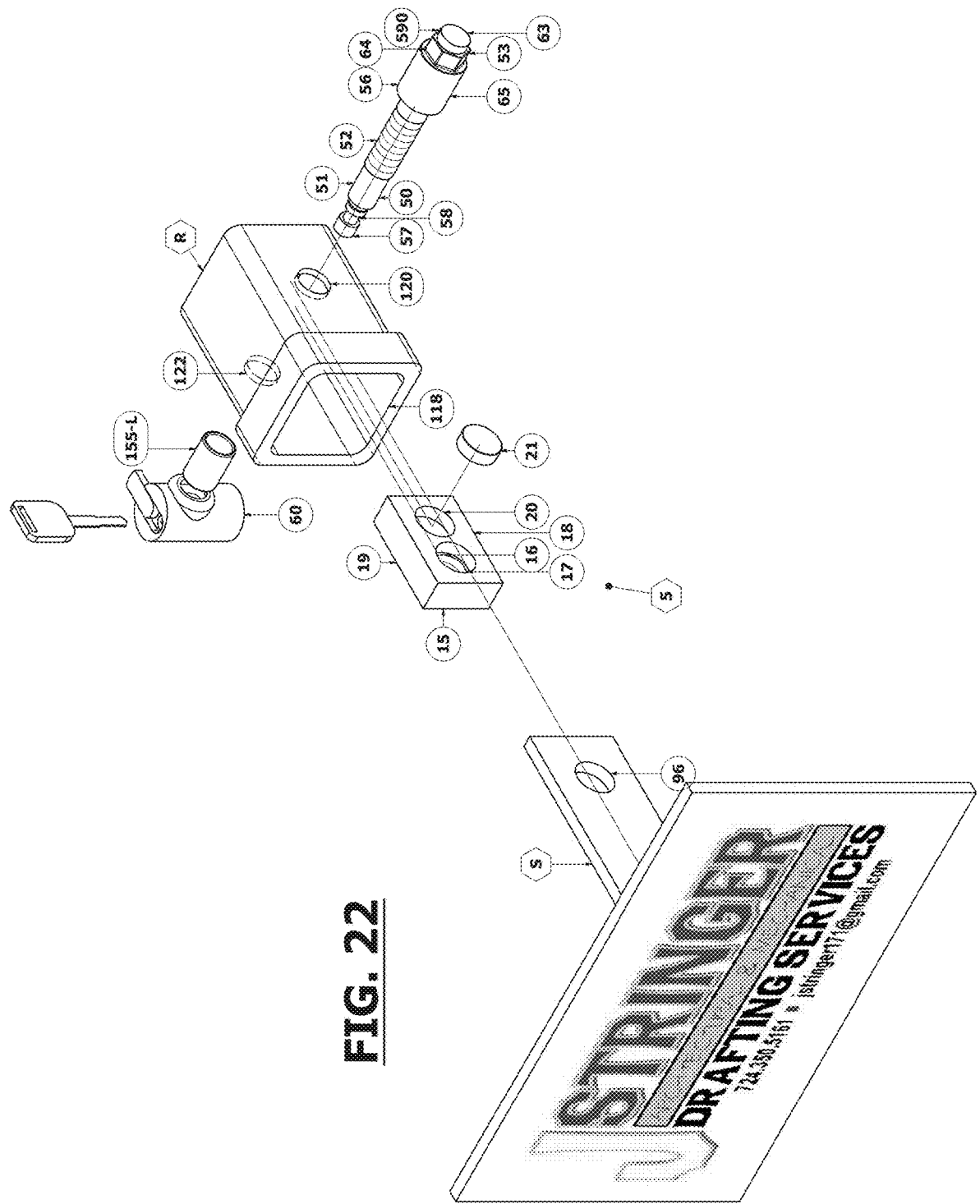
FIG. 22 is an exploded perspective view of yet another example of a magnetic cinch-block fastening and retaining device according to the present disclosure in combination with the shank of a hitch-mounted accessory and a receiver tube.

FIGS. 15 through 17 show an example of a cinch-block 15 as various style nuts comprising a magnet. These embodiments, shown with hexagonal-shaped rearward end 19, may be suitable for use when the nut is accessible for engaging a wrench or tool to hold or turn the nut when tightening. Examples of the nut being accessible for engaging a wrench within a vehicle's hitch receiver tube R may be when using an angle iron shank, channel shank, or flat bar shank, as shown in FIGS. 20 through 22.

FIG. 15 shows an example of a cinch-block 15 according to the present disclosure comprising a hexagonal nut with a ring-type magnet insert inserted within forward face 18 of nut 15 encircling throughbore 16, and which includes threading 17 on an inner surface of the throughbore 16 to receive corresponding external thread 52 of cinch-pin 50. Ring-type magnet 21 may be radially-symmetrically balanced in examples, or may be radially unbalanced in examples. FIG. 15 also shows that external threads 52 of cinch-pin 50 may continue along the entire length of cinch-pin shank midsection 51 to distal end 57. This embodiment shows, in lieu of groove 58, throughbore 59 in cinch-pin 50 near distal end 57 for fastening hitch pin clip 62. According to this example, of cinch-block 15 comprising a hexagonal nut may comprise a nylon collar insert (not shown) inserted within rearward side 19 encircling throughbore 16.

FIG. 16 shows an example of a cinch-block 15 according to the present disclosure comprising a hexagonal flange nut with a ring-type magnet 21 inserted into a corresponding recess 20 recessed within forward face 18 of flange area on flange nut of cinch-block 15. The inner surface of throughbore 16 may include threading 17 configured to coact with external threads 52 of cinch pin 50, as shown in FIG. 15. The surface of magnet 21 when positioned within recess 20 may be coextensive with the surface of front face side 18 of cinch-block 15, which may protect magnet 21 from being crushed, cracked, or damaged by compression resistance when forward face side 18 of cinch-block 15 is tightened firmly against shank (not shown).

FIG. 17 shows another example of a cinch-block 15 according to the present disclosure comprising a hexagonal flange nut with a ring-type magnet 21 inserted into a corresponding recess 20 recessed within forward face 18 of flange area on flange nut of cinch block 15. In this embodiment, the flange area surrounding ring magnet 21 comprises a serrated face surface 82. Serrated face surface 82 may provide stability when device 5 is being tightened against a shank, as shown in FIG. 1.

Figure 18:
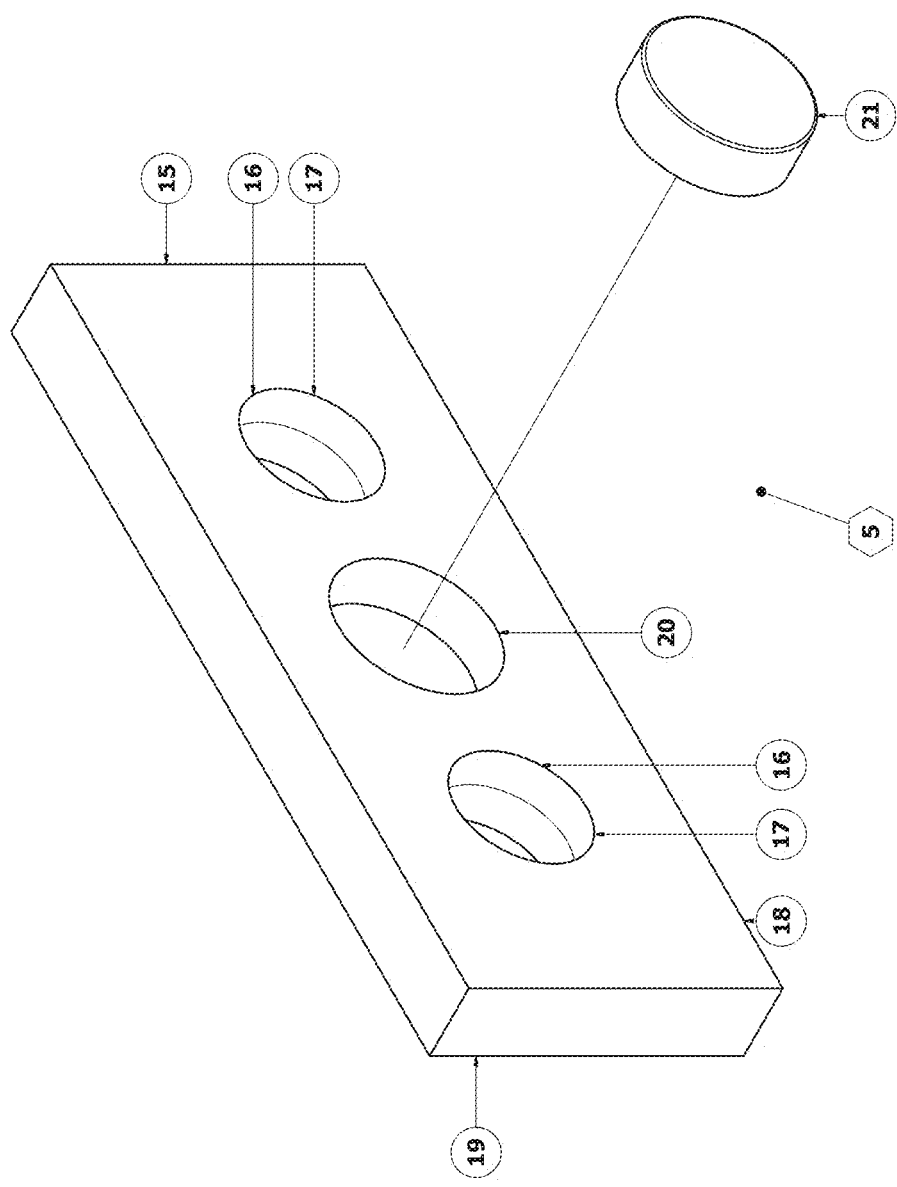
FIG. 18 is an exploded perspective view of another example of a cinch-block consistent with the present disclosure.

FIG. 18 shows an example of a cinch-block 15 having two throughbores 16 with internal thread convolutions 17 and one disk magnet 21 recessed within face side 18 in recess 20. This embodiment is configured to receive two threaded cinch-pins 50. It is to be understood that situations exist when more than one cinch pin 50 may be desirable to provide additional strength of stability in the attachment of the shank S in the receiver R, as shown in FIG. 1.

Figure 19:
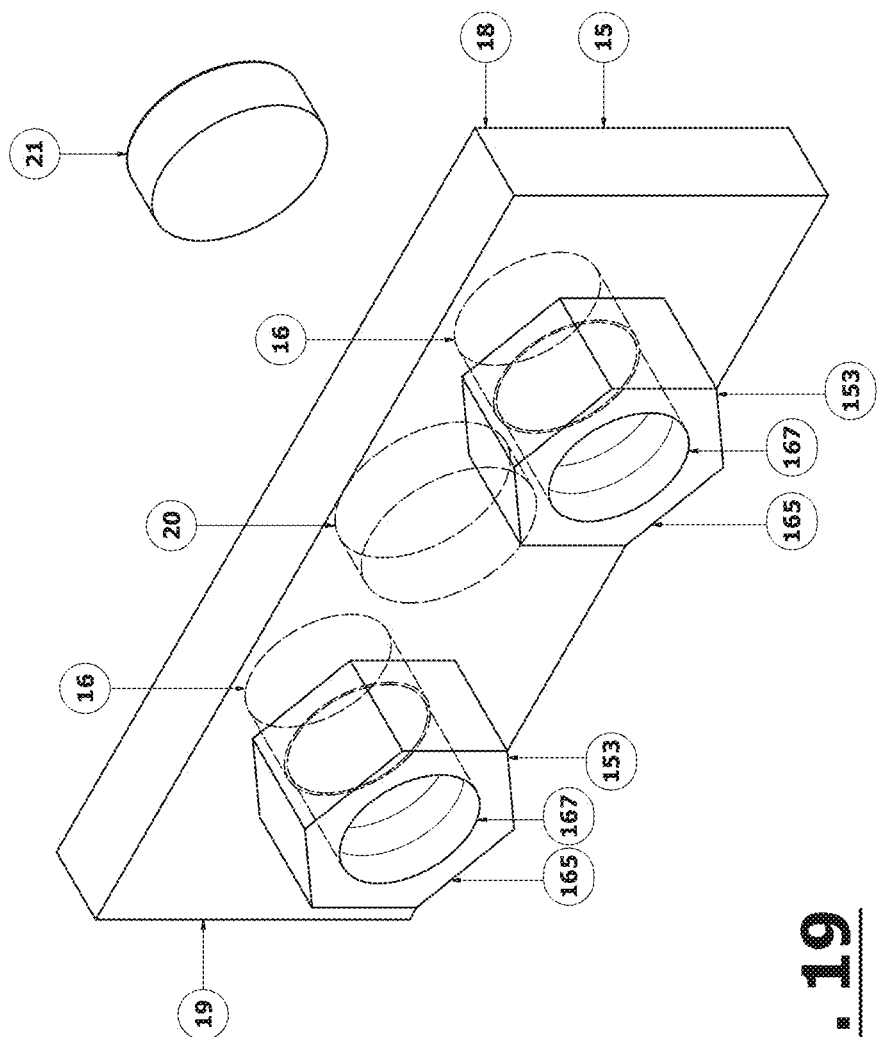
FIG. 19 is an exploded perspective view of yet another example of a cinch-block consistent with the present disclosure.

FIG. 19 shows an example of a cinch-block 15 consistent with the present disclosure having two throughbores 16 and one disk magnet 21 recessed in a recess 20 within face side 18. In the example shown, cinch-block 15 comprises two threaded nuts 165 in alignment with throughbores 16 and affixed to its rearward side 19 of cinch-block 15, such as by adhesive, mechanical fastening, welding, or another manner known in the art. Like the example of FIG. 18, the example of FIG. 19 is useful when the use of two threaded cinch-pins 50 may be desirable.

FIGS. 20 through 22 illustrate that the present invention may be applied to not only four-sided, tubular shanks, but is equally effective for use on various other shank-type configurations. FIG. 20 shows an example of an inventive hitch accessory magnetic cinch-block fastening and retaining device 5 applied to a two-sided, L-shaped, angle-iron type shank S. As with the example shown in FIG. 1, the example of the device 5 shown in FIG. 20 is comprised of cinch-block 15, cinch-pin 50, and sleeve 155-S. The cinch-pin 50 may be configured to receive a hitch pin clip 62 through a throughbore 59 (shown in FIG. 15) in cinch-pin 50, or to coact with a cinch-pin lock 60 (shown in FIG. 21). Cinch-block 15 comprises a throughbore 16 having an internal threaded convolution 17. Cinch-block 15 has a first forward face side 18 and second rearward side 19. Cinch-block 15 further comprises two recesses 20 recessed within its forward face side 18 in which magnets 21 are housed. In examples, the recesses 20 may be blind bore, but in other embodiments the recesses 20 may be threaded. Forward face side 19 of cinch-block 15 may be placed against a sidewall of shank S such that aperture 96 of the sidewall aligns with throughbore 16. Magnetic force emitted from magnets 21 pulls cinch-block 15 against the sidewall of shank S. With cinch-block 15 placed in position within accessory shank S and magnetically held in place against the sidewall of shank S, shank S is inserted into hollow cavity 118 of receiver R. Shank S is further inserted into receiver R until aperture 96 in shank S becomes aligned with aperture 120 in receiver R. With accessory shank aperture 96 aligned with receiver aperture 120, cinch-pin 50 is inserted through receiver aperture 120, through aperture 96 of shank S, through cinch-block throughbore 16, and through aperture 122 of receiver R.

When external threads 52 of cinch-pin 50 contacts cooperating internal thread convolution 17 in throughbore 16 of cinch-block 15, cinch-pin 50 is rotated to thread itself into cinch-block 15 pulling accessory shank S tight against the sidewall of receiver R and firmly securing shank S within receiver R. With cinch-pin 50 tightened securely, hollow sleeve 155-S is slid over cinch-pin distal end 57 until end of hollow sleeve 155-S abuts external threads 52 of cinch-pin 50 with opposed end of hollow sleeve 155-S extending through and protruding from aperture 122 of receiver R.

FIG. 21 shows an example of magnetic cinch-block fastening and retaining device 5 applied to a three-sided, U-shaped accessory shank S. In this example, a cinch-block 15 comprises a single bore 20 and magnet 21 offset from throughbore 16; however, it is to be understood that other examples of cinch-block 15 disclosed herein also may be used in the device 5 shown in FIG. 21. The example of FIG. 21 is similar to the example of FIG. 20, but with the addition that the cinch-pin 50 also passes through aperture 97 of shank S. Additionally, as with the example shown in FIG. 1, it is to be understood that example of cinch-block 15 compressing more than one magnet 21 also may be used.

FIG. 22 shows another example of a magnetic cinch-block fastening and retaining device 5 applied to a single, flat-bar accessory shank S shown as the shank S of a hitch-mounted sign. In the example according to FIG. 22, shank S may be affixed within receiver R in a manner according to the example of FIG. 20.

In various examples according to the present disclosure, when used on or in a hitch-mounted accessory shank, cinch-block 15 may be sized and shaped such that when cinch-pin 50 is rotated to thread itself into cinch-block 15, a portion of cinch-block 15 contacts a shank or receiver wall and prevents cinch-block 15 from rotating as torque is encountered during the tightening process.

With reference to FIGS. 9-12, examples including a bracket 70 attached to cinch-block 15 for attaching one or more magnet 21, in lieu of one or more magnet 21 being housed within milled blind-bore(s) 20 recessed in cinch-block 15, the magnets need not necessarily be positioned flush with forward face side 18 of cinch-block 15. Bracket 70 may be constructed from lighter-gage material that can flex, enabling magnet(s) 21 to be positioned on bracket 70 forward of forward face side 18 of cinch-block 15 wherein magnet(s) 21 are protected from damage when forward face side 18 of cinch-block 15 encounters compression resistance when tightening shank S to receiver R sidewall by the bracket flexing or springing inwardly preventing magnet(s) from being damaged.

Based upon the teachings presented in this application, it should be recognized and understood by one skilled in the art that the application and use of a threaded, magnetic cinch-block fastener is not limited in use to hitch-mounted accessory shanks, but can be applied in any instance wherein a metallic object comprising a throughbore is intended to be fastened to another object comprising a throughbore.

Figure 23:
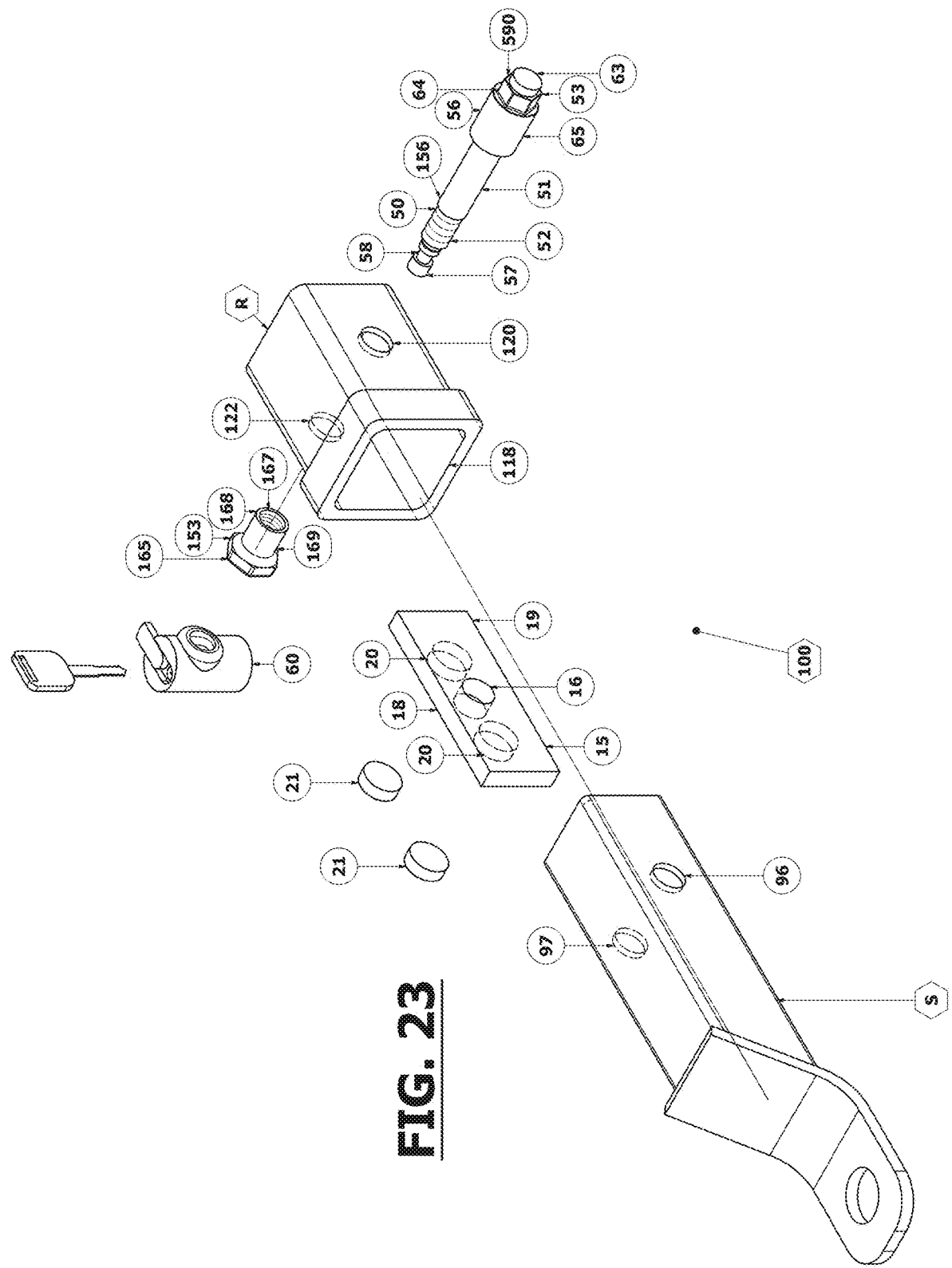
FIG. 23 is an exploded perspective view of yet another example of a magnetic cinch-block fastening and retaining device according to the present disclosure in combination with the shank of a hitch-mounted accessory and a receiver tube.

Referring to FIG. 23, there is shown another example of an inventive hitch accessory magnetic cinch-block fastening and retaining device 100. In this example, throughbore 16 in cinch-block 15 does not comprise an internal thread convolution; magnetic fastening and retaining device 100 further includes threaded fastener 165 and a portion of external threads 52 of shank midsection 51 extends beyond receiver shank aperture 122 when hitch-mounted accessory shank S is aligned in vehicle's hitch receiver R and cinch-pin 50 installed in position for completing coupling of shank S to receiver R by installing and tightening threaded fastener 165 on cinch-pin 50 by engaging the internal threads 167 of threaded nut 165 with cinch-pin's external threads 52.

Further, the example according to FIG. 23 shows cinch-pin 50 comprising of a first, proximal end 53; an elongated shank midsection 51; and a second, distal end 57. Proximal end 53 may be configured to include a non-circular shaped section (square or hexagonal and shown as hexagonal) 64 to engage a tool of a cooperating configuration for tightening cinch-pin 50 to a desired amount of torque or preventing cinch-pin 50 from rotating when threaded fastener 165 is tightened to the desired amount of torque. Along elongated shank midsection 51, the shank diameter may change size with a portion disposed towards proximal end 53 being larger in diameter than a portion disposed towards distal end 57. A transition point forming flat flange 156 may be disposed on midsection 51. Elongated shank midsection 51 also may comprise external threads 52 along the smaller shank diameter portion extending towards the distal end 57 a distance wherein external thread convolution protrudes through aperture 122 of receiver R when cinch-pin 50 is installed coupling hitch-mounted accessory shank S to vehicle's hitch receiver R.

With further reference to the example according to FIG. 23, cinch-block 15 comprises non-threaded throughbore 16. Cinch-block 15 has a first, forward face side 18 and second rearward side 19. Cinch-block 15 further comprises blind-bore recesses 20 recessed within its forward face side 18 in which magnets 21 are housed. Cinch-block 15 is placed within hollow cavity of shank S with forward face side 18 facing sidewall of shank S comprising aperture 97 wherein magnetic force emitted from magnet(s) 21 pulls cinch-block 15 against sidewall of shank S. Cinch-block 15 is moved into position wherein cinch-block throughbore 16 is aligned with shank aperture 97. With cinch-block 15 placed in position within accessory shank S, accessory shank S is inserted into hollow cavity 118 of receiver R. Shank S is further inserted into receiver R until aperture 97 in shank S becomes aligned with aperture 122 in receiver R. With accessory shank aperture 97 aligned with receiver aperture 122, cinch-pin 50 is inserted through receiver aperture 120, through aperture 96 of shank S, through cinch-block throughbore 16, through aperture 96 of shank S, and through aperture 122 of receiver R until flange 156 on cinch-pin midsection 51 contacts rearward side 19 of cinch-block 15. With external threads 52 of cinch-pin 50 protruding through receiver aperture 122 of receiver R, threaded fastener 165 is rotated to thread itself onto cinch-pin 50 pulling accessory shank S tight against the sidewall of receiver R and firmly securing shank S within receiver R. In examples, flange 156 of cinch-pin 50 may contact rearward side 19 of cinch-block 15. With threaded nut 165 torqued and cinch-pin 50 tightened securely, cinch-pin lock 60 is attached to hitch pin 50.

As shown in the example according to FIG. 23 threaded fastener 165 may be a shoulder nut with shoulder 168, flange 169 and hexagonal-shaped end 153. When threaded on cinch-pin 50, shoulder 168 functions as a protective sleeve and is recessed within receiver aperture 122 and shank aperture 97 and flange 169 contacts sidewall of receiver R creating compression resistance when torqued.

It is to be understood that when used within a 4-sided, hollow, accessory shank S as shown in FIG. 23, application of the example of device 100 may be used in the reverse direction as follows: cinch-block 15 may be placed within hollow cavity of shank S with forward face side 18 facing sidewall of shank S comprising aperture 96 wherein magnetic force emitted from magnet(s) 21 pulls cinch-block 15 against sidewall of shank S. Cinch-block 15 is moved and adjusted into position wherein throughbore 16 of cinch-block 15 is aligned with shank aperture 96. With cinch-block 15 seated in position within accessory shank S, accessory shank S is inserted into hollow cavity 118 of receiver R. Shank S is further inserted into receiver R until aperture 96 in shank S becomes aligned with aperture 120 in receiver R. With accessory shank aperture 96 aligned with receiver aperture 120, cinch-pin 50 is inserted through receiver aperture 122, through aperture 97 of shank S, through cinch-block throughbore 16, through aperture 96 of shank S, and through aperture 120 of receiver R until flange 156 on cinch-pin contacts rearward side 19 of cinch-block 15. With external threads 52 of cinch-pin 50 protruding through receiver aperture 120 of receiver R, threaded receiver 165 is rotated to thread itself onto cinch-pin 50 pulling accessory shank S tight against the sidewall of receiver R and firmly securing shank S within receiver R. With threaded fastener 165 torqued and cinch-pin 50 tightened securely, cinch-pin lock 60 is attached to cinch-pin 50.

Figure 24:
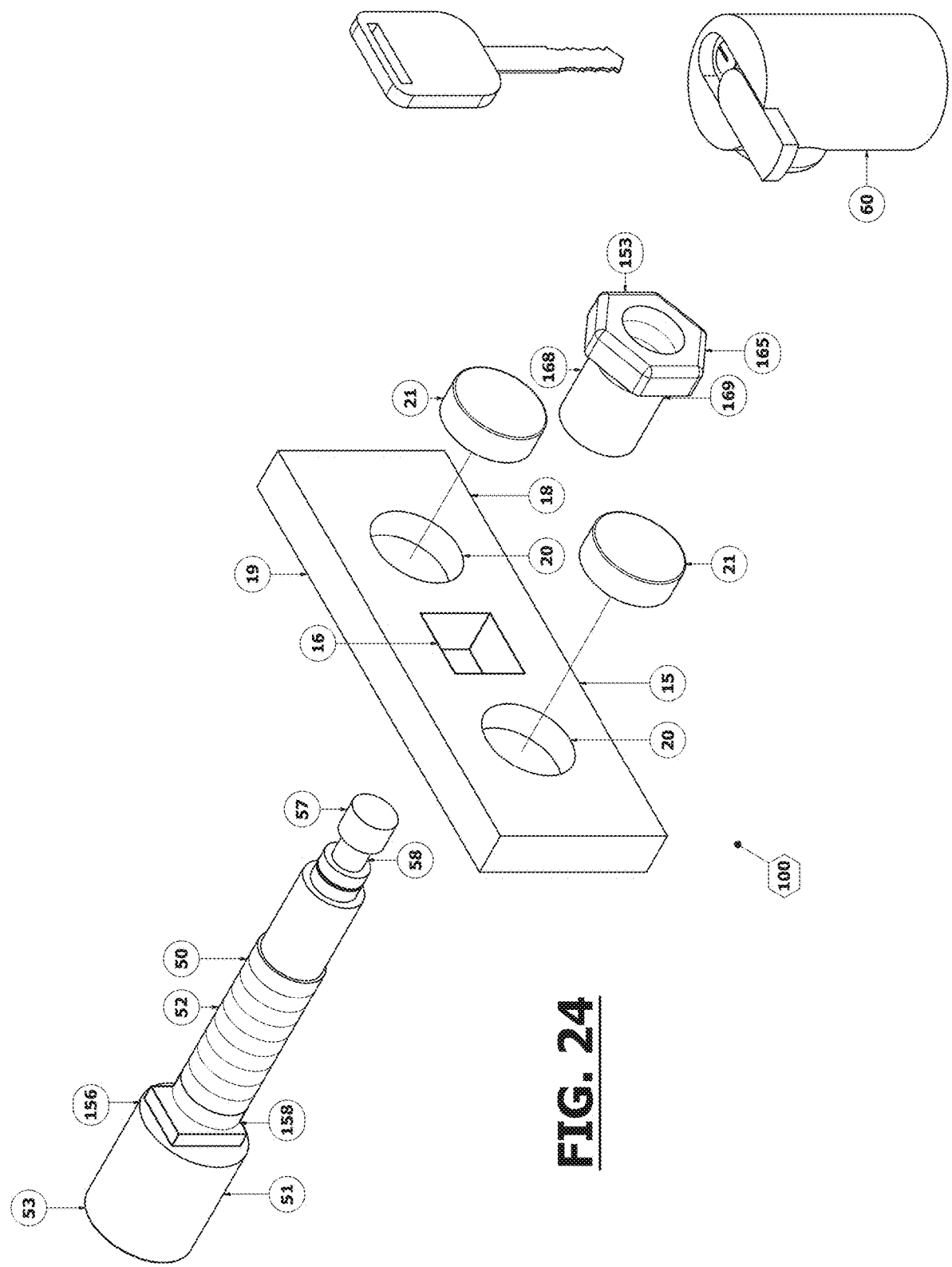
FIG. 24 is an exploded perspective view of another example of a magnetic cinch-block fastening and retaining device consistent with the present disclosure

FIG. 24 shows another example of cinch-block 15 and cinch-pin 50. As shown in the example in FIG. 24, throughbore 16 of cinch-block 15 may be non-circular-shaped, such as square, as shown. Cinch-pin mid-section 51 comprises a square-shaped section 158 that engages corresponding square throughbore 16 of cinch-block 15, interlocking cinch-pin 50 with cinch-block 15 preventing cinch-pin 50 from rotating when torque is applied when tightening threaded fastener 165 on cinch-pin 50. As with the example shown in FIG. 23, flange 156 contacts rearward side 19 of cinch-block 15 when installed. With cinch-pin 50 interlocked with throughbore 16, proximal end 53 of cinch-pin 50 need not be additionally configured for aiding in threading and firmly tightening cinch-pin 50, as with hexagonal portion 64 of FIG. 23.

Figure 25:
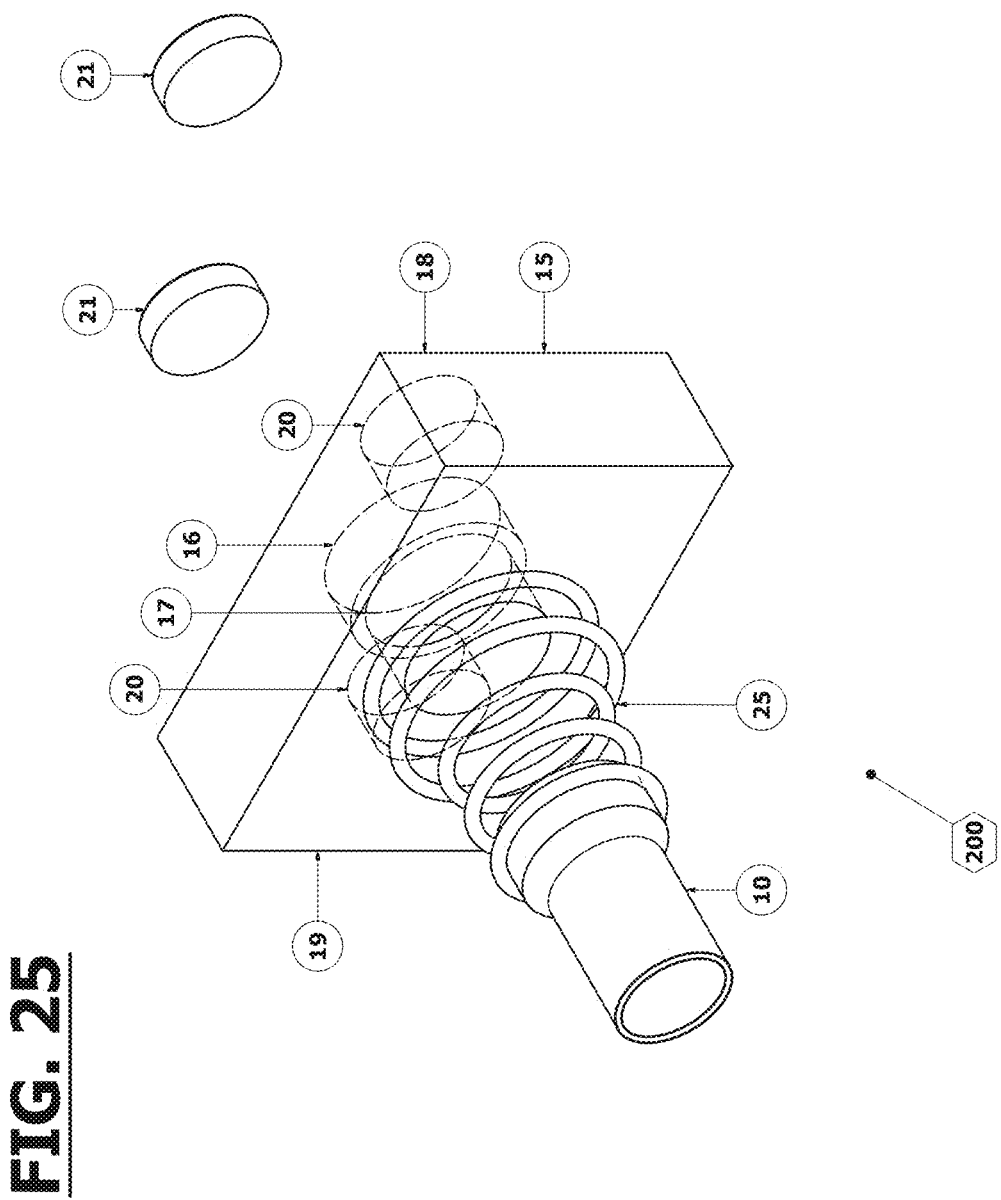
FIG. 25 is an exploded perspective view of yet another example of a cinch-block consistent with the present disclosure.

Referring to FIG. 25, another example of cinch-block 15 further includes hollow retractable hitch engagement pin 10 and bias element 25 (shown in the figure as a spring) as described, illustrated and claimed in this inventor's U.S. Pat. No. 9,242,521 B2, the disclosure of which is incorporated by reference as if fully restated herein. In the example according to FIG. 25, hollow, retractable engagement pin 10 and bias element 25 contacts, is attached to, or made part of magnetic cinch-block 15. Bias element 25 may be attached to cinch-block via adhesive, welding, soldering, mechanical fastening, or any other manner known in the art.

With reference to FIGS. 1 and 25, and apply the cinch-block shown in FIG. 25 with the shank S, receiver R, and cinch-pin 50 according to FIG. 1 for another embodiment of device 200, hollow engagement pin 10 is compressed inwardly toward cinch-block 15 as cinch-block 15 is partially placed within hollow cavity of shank S with forward face side 18 facing sidewall of shank S comprising aperture 96 wherein magnetic force emitted from magnets 21 pulls cinch-block 15 against sidewall of shank S. Cinch-block 15 is moved into position wherein cinch-block throughbore 16 is aligned with shank aperture 96. As cinch-block throughbore 16 aligns with shank aperture 96, engagement pin 10 aligns with shank aperture 97 and bias element 25 automatically actuates engagement pin 10 to an extended position pushing a portion of engagement pin 10 through shank aperture 97. With cinch-block 15 placed in position within accessory shank S and magnetically held in place against shank sidewall with engagement pin 10 protruding through shank aperture 97, engagement pin 10 is biased inwardly and accessory shank S inserted into hollow cavity 118 of receiver R. Shank S is further inserted into receiver R until engagement pin 10 aligns with aperture 122 in receiver R wherein engagement pin 10 automatically actuates to an extended position and protrudes through and from aperture 122 of hitch receiver R.

With accessory shank S automatically aligned within receiver R, cinch-pin 50 is inserted through receiver aperture 120, through aperture 96 of shank S, through cinch-block throughbore 16, and through hollow engagement pin 10, with hollow engagement pin 10 being through aperture 97 of shank S and through aperture 122 of receiver R. When external threads 52 of cinch-pin 50 contacts cooperating internal thread convolution 17 in throughbore 16 of cinch-block 15, cinch-pin 50 is rotated to thread itself into cinch-block 15 pulling accessory shank S tight against the sidewall of receiver R and firmly securing shank S within receiver R. With cinch-pin 50 tightened securely, cinch-pin lock 60 or hitch pin clip 62 may be attached to cinch-pin distal end 57. With this embodiment, hollow engagement pin 10 serves as a cinch-pin sleeve, and, thus, neither hollow sleeve 155-S or lock sleeve 155-L is used.

Figure 26:
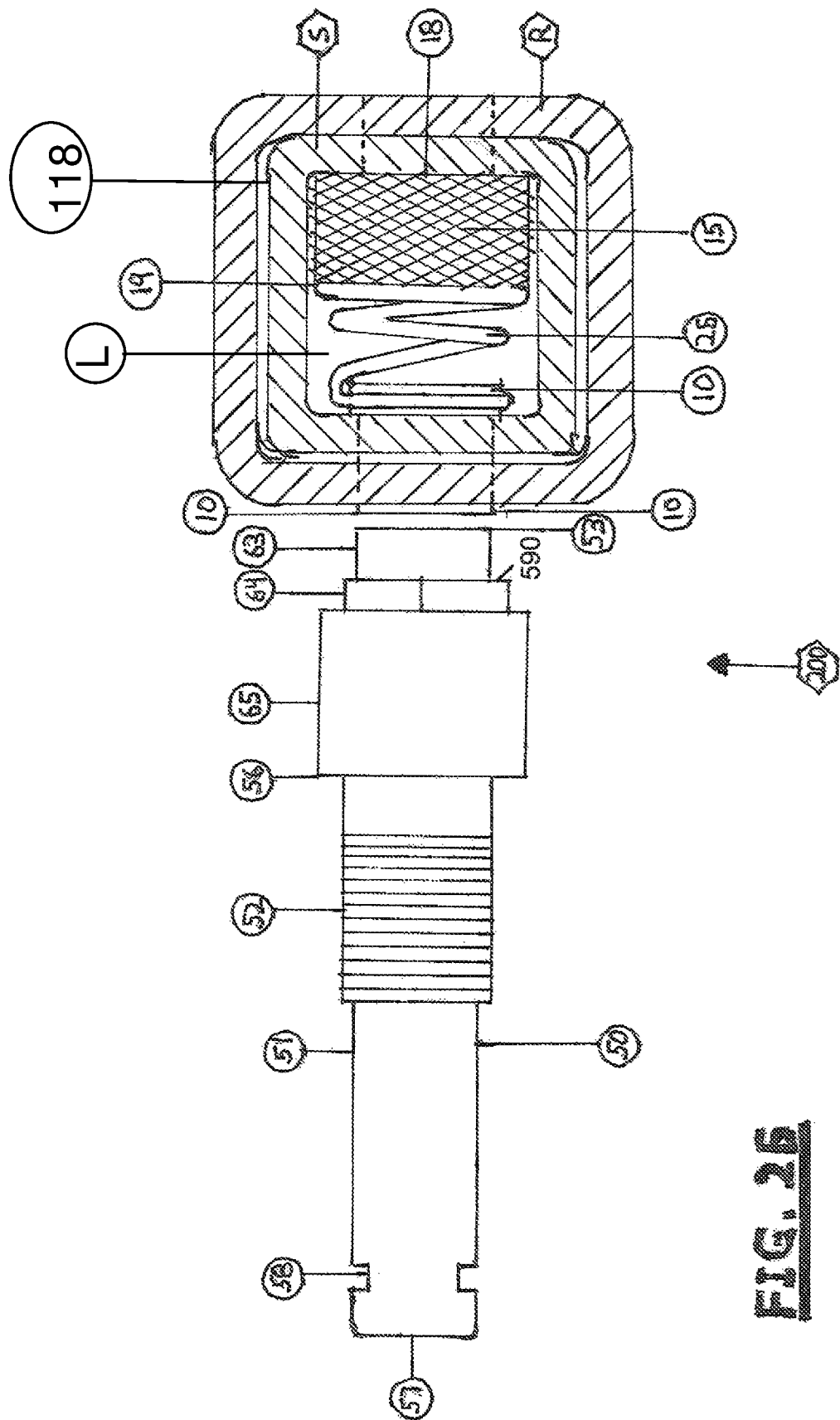
FIG. 26 is a cross-sectional view of an example of a magnetic cinch-block fastening and retaining device including the example of the cinch-block of FIG. 25.

FIG. 26 is a cross sectional view of an example of magnetic cinch-block fastening and retaining device 200 according to FIG. 25. Hitch-mounted accessory is removed from receiver R by removing cinch-pin lock 60 (as shown in FIG. 1) o hitch pin clip 62 from throughbore 57 (as shown in FIG. 15) and loosening and removing cinch-pin 50. With cinch-pin 50 removed, cylindrical-shaped end 63 of cinch-pin head 65 on proximal end 53 of cinch-pin 50 may be used to depress hollow engagement pin 10 to a retracted position, disengaging it from receiver R. From the outermost end of proximal end 53 of cinch-pin 50, cylindrical-shaped end 63 extends inwardly towards distal end 57. In an example, this distance is approximately 0.25 inches (or approximately equivalent to the thickness of an industry-standard receiver). Proximal end 53 may have a smaller diameter than cylindrical-shaped end 65, forming flat flange 590. Depressing hollow engagement pin 10 with the cylindrical-shaped end 63 of cinch-pin head 65 on proximal end 53 of cinch-pin 50 disengages hollow engagement pin 10 from the vehicle's receiver R. By depressing hollow engagement pin 10 with cylindrical-shaped end 63 and inserting cylindrical-shaped end 63 into the aperture in receiver R to a depth in which flat flange 590 touches outer sidewall of receiver R, hollow engagement pin 10 is disengaged from receiver R but continues to be engaged with accessory shank aperture 97. With hollow engagement pin 10 biased inwardly and disengaged from receiver R, the hitch accessory may be removed from the receiver R.

As can be recognized and appreciated by one skilled in the art, embodiment 200 can be used in the reverse direction from that described in with respect to device 100 and FIGS. 1 and 25.

The tightening cinch-pin assembly of this embodiment is not only an innovative magnetic cinch-pin fastening and retaining device, but also a cinch-pin fastening and retaining device that is self-aligning and self-engaging for pinning a hitch accessory shank S within a vehicle's receiver R.

Figure 27:
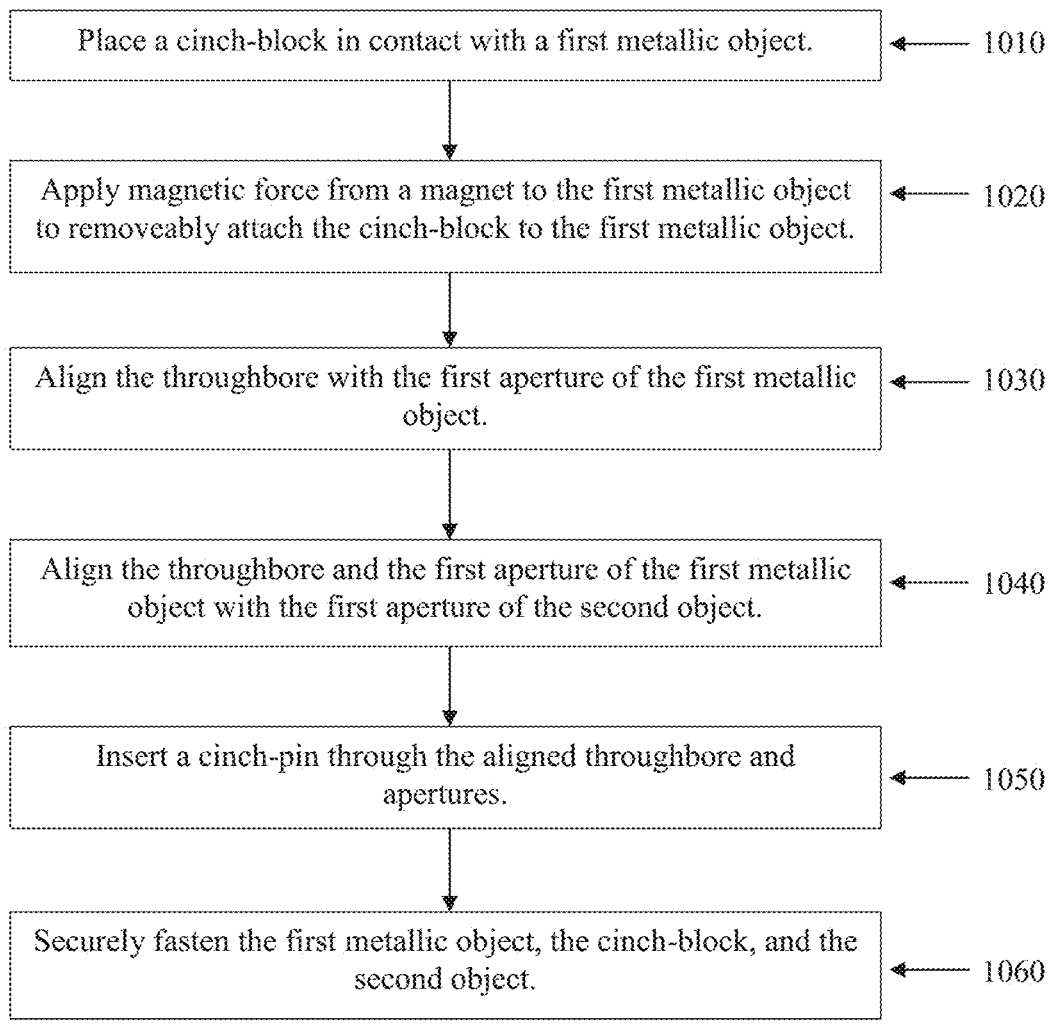
FIG. 27 is a flow chart showing steps of an exemplary method according to the present disclosure.

FIG. 27 shows steps of an exemplary method for using the device 5 according to the present disclosure. With reference to FIGS. 1 and 27, step 1010 includes placing a cinch-block 15 in contact with a first metallic object, such as a shank S of a hitch accessory. Step 1020 includes applying magnetic force from a magnet 21 to the first metallic object to removably attach the cinch-block 15 to the first metallic object. Step 1030 includes aligning the throughbore 16 of the cinch-block 15 with the first aperture, such as aperture 96 of shank S, of the first metallic object. Step 1040 includes aligning the throughbore 16 of the cinch-block 15 and the first aperture, such as aperture 96, of the first metallic object, such as shank S, with the first aperture, such as aperture 120, of the second object, such as receiver R. Step 1050 includes inserting the cinch-pin 50 through the aligned throughbore 16 and apertures 120, 96. Step 1060 includes securely fastening the first metallic object S, the cinch-block 15, and the second object R, such as by tightening the cinch-pin 50. An example of the mechanism by which the device 5 may securely fasten shank S and receiver R is the engagement between external threads 52 of cinch-pin 50 and threaded convolutions 17 of throughbore 16 of cinch-block 15.

The invention further may be characterized by one or more of the following clauses.

Clause 1: A magnetic fastening device for fastening a first metallic object having a first aperture to a second object having a first aperture, the magnetic cinch block fastening device comprises: a cinch-block comprising: a body comprising a first and a second opposing side, a throughbore passing through the body from the first opposing side to the second opposing side, and at least one magnet, wherein the at least one magnet is configured to apply magnetic force to removably attach the cinch-block to the first metallic object, and wherein the throughbore of the cinch-block is configured to align with the first aperture of the first metallic object and the first aperture of the second object; a cinch-pin comprising: a proximal end, a distal end, and an elongated midsection connecting the proximal and distal ends, and external threads disposed on at least a first threaded portion of a surface of the elongated midsection; wherein the cinch-pin is configured to pass through the aligned throughbore and apertures to securely fasten the first metallic object, the cinch-block, and the second object.

Clause 2: The magnetic fastening device according to Clause 1, wherein the throughbore of the cinch-block has a circular cross section.

Clause 3: The magnetic fastening device according to Clause 2, wherein the throughbore comprises internal threaded convolutions, and the external threads of the cinch-pin coact with the internal threaded convolutions to securely fasten the first metallic object, the cinch-block, and the second object.

Clause 4: The magnetic fastening device according to any of clauses 1 to 3, wherein the cinch-pin further comprises a flange positioned between the proximal end and the threaded first portion, wherein the flange has a larger diameter than a diameter of the threaded first portion.

Clause 5: The magnetic fastening device according to any of clauses 1 to 4, wherein the first metallic object comprises a hitch-mounted accessory shank, and the second object comprises a vehicle hitch receiver.

Clause 6: The magnetic fastening device according to any of clauses 1 to 5, wherein the cinch-block body comprises at least one recess disposed in the first opposing side and having a depth equal to or greater than a thickness of the at least one magnet; and wherein the at least one recess houses the at least one magnet.

Clause 7: The magnetic fastening device according to any of clauses 1 to 6, wherein the cinch-block further comprises: an engagement pin comprising a hollow passage, and a biasing member comprising a first end and a second end, wherein the first end of the biasing member is affixed to the second opposing side of the cinch-block, and the second end of the biasing member is affixed to the engagement pin, wherein the engagement pin is configured to align with the throughbore, the first apertures of the first metallic object and second object, a second aperture in the first metallic object, and a second aperture in the second object, and wherein the cinch-pin is configured to pass through the aligned throughbore and apertures to securely fasten the first metallic object, the cinch-block, and the second object.

Clause 8: The magnetic fastening device according to Clauses 1 to 7, wherein at least a first portion of the cinch-block is hexagonally shaped.

Clause 9: The magnetic fastening device according to any of clauses 1 to 8, wherein the throughbore of the cinch-block has a non-circular cross section.

Clause 10: The magnetic fastening device according to any of clauses 1 to 9, wherein the cinch-pin further comprises an annular groove positioned on the distal end and configured to engage a cinch-pin lock, and wherein the cinch-pin is configured to be inserted completely through the aligned throughbore, first aperture of the first metallic object, first aperture of the second object, a second aperture in the first metallic object, and a second aperture in the second object, to securely fasten the first metallic object, the cinch-block, and the second object.

Clause 11: The magnetic fastening device according to any of clauses 1 to 9, wherein the cinch pin further comprises a throughbore disposed in the distal end configured to engage a hitch pin clip, and wherein the cinch-pin is configured to be inserted completely through the aligned throughbore, first aperture of the first metallic object, first aperture of the second object, a second aperture in the first metallic object, and a second aperture in the second object, to securely fasten the first metallic object, the cinch-block, and the second object.

Clause 12: The magnetic fastening device according to any of clauses 1 to 11, wherein the cinch-pin further comprises: a first length of the elongated midsection having a first diameter, and a second length of the elongated midsection having a second diameter that is larger than the first diameter, and is disposed proximally from the first length, and a third length having a third diameter that is smaller than the second diameter, and is slightly smaller than a diameter of the first aperture of the second object, and comprises a circular cross section, wherein a first transition point between the first and second lengths defines a first flat flange, and a second transition point between the second and third lengths defines a second flat flange.

Clause 13: The magnetic fastening device according to any of clauses 1 to 8 and 10 to 12, wherein the cinch pin further comprises a non-cylindrical head disposed at the proximal end, and wherein the head is configured to be manipulated by a corresponding tool to aid in tightening the cinch-pin.

Clause 14: The magnetic fastening device according to clause 6, wherein the at least one magnet comprises a ring shape, and the at least one recess comprises a corresponding ring shape having a central flange configured to receive and support the at least one magnet.

Clause 15: A magnetic fastening device for fastening a first metallic object having a first aperture to a second object having a first aperture, the magnetic cinch block fastening device comprises: a cinch-block comprising: a body comprising a first and a second opposing side, and a throughbore passing through the body from the first opposing side to the second opposing side, wherein the throughbore of the cinch-block is configured to align with the first aperture of the first metallic object and the first aperture of the second object; a bracket connected to the body of the cinch-block and comprising at least one magnet configured to apply magnetic force to removably attach the cinch-block to the first metallic object; and a cinch-pin comprising: a proximal end, a distal end, and an elongated midsection connecting the proximal and distal ends, and external threads disposed on at least a first portion of a surface of the elongated midsection; wherein the cinch-pin is configured to pass through the aligned throughbore and apertures and securely fasten the first metallic object, the cinch-block, and the second object.

Clause 16: The magnetic fastening device of Clause 15, wherein the bracket comprises a shroud that houses the cinch-block, wherein the at least one magnet is disposed on or in the shroud.

Clause 17: The magnetic fastening device of any of clauses 15 to 16, wherein the proximal end of the cinch-pin comprises a recess configured to receive a tool to manipulate the cinch-pin.

Clause 18: A method for attaching a first metallic object having a first aperture to a second object having a first aperture comprises the steps of: placing a cinch-block in contact with the first metallic object, the cinch-block comprising: a body having first and second opposing sides, a throughbore passing through the body from the first opposing side to the second opposing side, and at least one magnet, applying magnetic force from the at least one magnet to the first metallic object to removably attach the cinch-block to the first metallic object; aligning the throughbore with the first aperture of the first metallic object; aligning the throughbore and the first aperture of the first metallic object with the first aperture of the second object; inserting a cinch-pin through the aligned throughbore and apertures, the cinch-pin comprising: a proximal end, a distal end, and an elongated midsection connecting the proximal and distal ends, and external threads disposed on at least a first portion of a surface of the elongated midsection; and; securely fastening the first metallic object, the cinch-block, and the second object.

Clause 19: The method according to Clause 18, wherein the first metallic object comprises a shank of a hitch-mounted accessory, and the second object comprises a hitch receiver.

Clause 20: A magnetic cinch-block fastening device for fastening a metallic object comprising a throughbore to another object comprising a throughbore with fastening device comprises: a cinch-block comprising: a forward face side and a rearward side; at least one magnet contacting, attached to, recessed within, or part of the cinch-block; at least one throughbore in the cinch-block for engaging a bolt or cinch-pin having an external thread convolution wherein the cinch-block is configured to adhere itself to a metallic object comprising a throughbore and when the throughbore in the cinch-block is aligned with a throughbore in the metallic object the cinch-block is maintained in position on the metallic object by magnetic force emitted by the magnet, wherein the bolt or cinch-pin may be inserted through the objects and cinch-block to cinch the two objects together.

Clause 21: The magnetic cinch-block fastening device of Clause 20 wherein the throughbore in the cinch-block is circular in shape.

Clause 22: The magnetic cinch-block fastening device of Clause 20 wherein the throughbore in the cinch-block is non-circular in shape.

Clause 23: The magnetic cinch-block fastening device of Clause 21 wherein the circular-shaped throughbore in the cinch-block comprises an internal thread convolution.

Clause 24: The magnetic cinch-block fastening device of Clause 23 further including an elongated cinch-pin comprising a first distal end, an elongated shank midsection having an external threaded convolution, and a second proximal end wherein the proximal end contains a head larger in diameter than the threaded elongated shank midsection thereby forming a flange at the diameter change transition point on the head with the external threads on the cinch-pin's midsection configured to cooperate with and engage the internal threads in the magnetic cinch-block.

Clause 25: The magnetic cinch-block fastening device and cooperating cinch-pin of Clause 24 applied to a hitch-mounted accessory shank and vehicle hitch receiver.

Clause 26: The magnetic cinch-block fastening device of Clause 20 wherein the cinch-block further comprises at least one blind bore recess in the cinch-block's forward face side bored parallel with the throughbore at a depth equivalent to or slightly greater than the thickness of the magnet wherein the shape of the magnet corresponds with the shape of the blind bore recess with the magnet placed in and retained within the blind bore recess.

Clause 27: A cinch-pin comprising a first distal end, an elongated shank midsection, and a second proximal end wherein: the first distal end comprises a throughbore or annular grove for attaching a cinch-pin lock or industry-standard hitch pin clip and configured to be inserted completely through aligned apertures in a hitch receiver and completely through a hitch-mounted accessory shank; the elongated shank midsection extends at least the distance equivalent to an outside dimension of the width of a hitch receiver; and the second proximal end comprises a head comprising two flat flanges resulting from the head being larger in diameter than the first distal end and elongated shank midsection forming a first flat flange at the diameter change transition point, and larger in diameter than the second distal end forming a second flat flange wherein the pin diameter decreases in size forming the second flat flange at the second diameter change transition point creating a proximal end that is cylindrical in shape extending from the second flat flange to the pin's outermost proximal end a distance approximately equivalent to the thickness of a receiver sidewall, wherein the diameter of the cylindrical-shaped proximal end is slightly smaller than the diameter of a throughbore in a receiver.

Clause 28: The cinch-pin of Clauses 23 or 27 further comprises an external thread convolution on a portion of elongated shank mid-section, and a non-circular configuration on a portion of the head between flat flanges for engaging a wrench or tool of a corresponding configuration for rotating and tightening cinch-pin.

Clause 29: The magnetic cinch-block fastening device of Clauses 23 or 27, further including an engagement pin and biasing device with biasing device contacting, attached to, or part of the cinch-block.

Clause 30: The magnetic cinch-block fastening device of Clause 20 wherein the magnet is indirectly attached to the cinch-block by use of a bracket contacting or attached to cinch-block and magnet attached to the bracket.

Clause 31: The magnetic cinch-block fastening device of Clause 20 wherein the magnet is indirectly attached to the cinch-block by use of a shroud or housing that houses cinch-block with magnet attached to the shroud or housing.

Clause 32: The magnetic cinch-block fastening device of Clause 22 further including a cinch-pin.

Clause 33: The magnetic cinch-block fastening device of Clause 23 wherein at least a portion of the cinch-block is hexagonally shaped.

Clause 34: A method of cinching a first metallic object comprising a throughbore to a second object comprises at least one throughbore by placing the forward face side of a magnetic cinch-block comprising a magnet and throughbore comprising an internal thread convolution on or in the metallic object and aligning the threaded throughbore in the cinch-block with the throughbore in the metallic object wherein the cinch-block is retained in aligned position on or in the cinch-block by magnetic force wherein throughbores in the cinch-block and metallic object are aligned with throughbore in the second object, and by further inserting a cinch-pin comprising an external thread convolution through the throughbores in the objects and cinch-block wherein the external threads on the cinch-pin cooperate with the internal threads in the cinch-block wherein the cinch pin is rotated and tightened in cinch-block cinching the two objects firmly together.

Clause 35: The method of Clause 34 wherein the first metallic object is a shank of a hitch-mounted accessory and the second object is a hitch receiver.

Clause 36: A magnetic fastening device for fastening a first metallic object having a first aperture to a second object having a first aperture, comprising: a cinch-block comprising: a body comprising a first and a second opposing side, a throughbore passing through the body from the first opposing side to the second opposing side along a first axis, and a first magnet disposed on a second axis, wherein the second axis is laterally offset from and parallel to the first axis, wherein the first magnet is configured to apply magnetic force to removably attach the cinch-block to the first metallic object, and wherein the throughbore of the cinch-block is configured to align with the first aperture of the first metallic object and the first aperture of the second object; a cinch-pin comprising: a proximal end, a distal end, and an elongated midsection connecting the proximal and distal ends; wherein the cinch-pin is configured to pass through the aligned throughbore and apertures to securely fasten the first metallic object, the cinch-block, and the second object; wherein the body of the cinch-block is configured to coact with at least one of the first metallic object, the second object, or both the first metallic object and the second object to limit rotation during fastening.

Clause 37: The magnetic fastening device according to Clause 36, wherein at least a portion of the body of the cinch-block is uncovered by the first magnet.

Clause 38: The magnetic fastening device according to any of Clauses 36-37, wherein the cinch pin further comprises external threads disposed on at least a first threaded portion of a surface of the elongated midsection.

Clause 39: The magnetic fastening device according to Clause 38, wherein the throughbore comprises internal threaded convolutions, and the external threads of the cinch-pin coact with the internal threaded convolutions to securely fasten the first metallic object, the cinch-block, and the second object.

Clause 40: The magnetic fastening device according to any of Clauses 36-39, wherein the cinch-block comprises at least a second magnet configured to apply magnetic force to removably attach the cinch-block to the first metallic object.

Clause 41: The magnetic fastening device according to any of Clauses 36-40, wherein the first metallic object comprises a hitch-mounted accessory shank, and the second object comprises a vehicle hitch receiver.

Clause 42: The magnetic fastening device according to any of Clauses 36-41, wherein the cinch-block further comprises: an engagement pin comprising a hollow passage, and a biasing member comprising a first end and a second end, wherein the first end of the biasing member is affixed to the second opposing side of the cinch-block, and the second end of the biasing member is affixed to the engagement pin, wherein the engagement pin is configured to align with the throughbore, the first apertures of the first metallic object and second object, a second aperture in the first metallic object, and a second aperture in the second object, and wherein the cinch-pin is configured to pass through the aligned throughbore and apertures to securely fasten the first metallic object, the cinch-block, and the second object.

Clause 43: The magnetic fastening device according to any of Clauses 36-42, wherein the cinch-pin further comprises a throughbore disposed in the distal end configured to engage a hitch pin clip, and wherein the cinch-pin is configured to be inserted completely through the aligned throughbore, first aperture of the first metallic object, first aperture of the second object, a second aperture in the first metallic object, and a second aperture in the second object, to securely fasten the first metallic object, the cinch-block, and the second object.

Clause 44: The magnetic fastening device according to any of Clauses 36-43, wherein the cinch-pin further comprises: a first length of the elongated midsection having a first diameter, and a second length of the elongated midsection having a second diameter that is larger than the first diameter, and is disposed proximally from the first length, and a third length having a third diameter that is smaller than the second diameter, and is slightly smaller than a diameter of the first aperture of the second object, and comprises a circular cross section, wherein a first transition point between the first and second lengths defines a first flat flange, and a second transition point between the second and third lengths defines a second flat flange.

Clause 45: The magnetic fastening device according to any of Clauses 36-44, wherein the cinch-pin further comprises a non-cylindrical head disposed at the proximal end, and wherein the head is configured to be manipulated by a corresponding tool to aid in tightening the cinch-pin.

Clause 46: A magnetic fastening device for fastening a first metallic object having a first aperture to a second object having a first aperture, the magnetic cinch-block fastening device comprising: a cinch-block comprising: a body comprising a first and a second opposing side, a throughbore passing through the body from the first opposing side to the second opposing side, and a first magnet, wherein the first magnet is configured to apply magnetic force to removably attach the cinch-block to the first metallic object, and wherein the throughbore of the cinch-block is configured to align with the first aperture of the first metallic object and the first aperture of the second object; a cinch-pin comprising: a proximal end, a distal end, and an elongated midsection connecting the proximal and distal ends; wherein the cinch-pin is configured to pass through the aligned throughbore and apertures to securely fasten the first metallic object, the cinch-block, and the second object; wherein the body of the cinch-block is configured to coact with at least one of the first metallic object, the second object, or both the first metallic object and the second object to limit rotation during fastening.

Clause 47: The magnetic fastening device according to Clause 46, wherein the first magnet is disposed on an axis, and wherein the axis is laterally offset from and parallel to the throughbore.

Clause 48: The magnetic fastening device according to any of Clauses 46-47, further comprising a receiver portion configured to coact with the cinch-pin to securely fasten the first metallic object, the cinch-block, and the second object.

Clause 50: The magnetic fastening device according to Clause 46 wherein: the receiver portion comprises internal threaded convolutions, the cinch-pin comprises external threaded convolutions, and the external threaded convolutions and the internal threaded convolutions coact to securely fasten the first metallic object, the cinch-block, and the second object.

Clause 51: The magnetic fastening device according to Clause 50, wherein the external threaded convolutions are disposed on at least one of the proximal end, the distal end, and/or the elongated midsection of the cinch-pin.

Clause 52: The magnetic fastening device according to any of Clauses 46-51, wherein: the throughbore of the cinch-block comprises a non-circular shape, and the cinch pin comprises a non-circular cross-section configured to engage the throughbore and limit rotation when torque is applied to the cinch-pin.

Clause 53: The magnetic fastening device according to Clause 52, wherein the non-circular cross-section is disposed on at least one of the proximal end, the distal end, and/or the elongated midsection of the cinch-pin.

Clause 54: The magnetic fastening device according to any of Clauses 46-53, wherein the throughbore of the cinch-block has a circular cross section.

Clause 55: The magnetic fastening device according to Clause 50, wherein the receiver portion comprises a lock, and the distal end of the cinch-pin comprises a groove, and the lock and groove are configured to coact to securely fasten.

Clause 56: A magnetic fastening device for securely fastening a tubular trailer-hitch accessory shank within a tubular trailer hitch receiver, the magnetic fastening device comprising: a cinch-block comprising: a body comprising a first opposing side and a second opposing side, a throughbore having an axis and passing through the body from the first opposing side to the second opposing side, and at least one magnet positioned on the first opposing side of the cinch-block and laterally offset from the axis of the throughbore; a cinch-pin comprising: a proximal end, a distal end, and an elongated midsection connecting the proximal and distal ends; wherein the tubular trailer hitch accessory shank comprises a first sidewall having an exterior surface, a lumen (L), and a first aperture in the first sidewall extending from the exterior surface to the lumen (L), wherein the tubular trailer-hitch receiver comprises a first sidewall and a first aperture in the first sidewall, wherein the at least one magnet applies magnetic force to removably attach the cinch-block within the lumen (L) of trailer-hitch accessory shank, and wherein the throughbore of the cinch-block is configured to align with the first aperture of the tubular trailer-hitch accessory shank and the first aperture of the tubular trailer hitch receiver, wherein the cinch-pin is configured to pass through the throughbore of the cinch-block, the first aperture of the tubular trailer hitch accessory shank, and the first aperture of the trailer-hitch receiver to securely fasten the tubular trailer hitch-accessory shank to the tubular trailer hitch receiver, wherein the cinch-pin is configured to securely fasten the tubular trailer hitch-accessory shank to the tubular trailer hitch receiver when entering the throughbore either from the first opposing side or the second opposing side of the cinch-block, and wherein the body of the cinch-block is configured to coact with the tubular trailer hitch accessory shank to limit rotation during fastening.

It is to be understood that the present invention is not limited to the examples described above but encompasses any and all embodiments within the scope of the following claims.

The invention claimed is:

1. A magnetic fastening device for fastening a first metallic object having a first aperture to a second object having a first aperture, comprising:
   a cinch-block comprising:
      a body comprising a first and a second opposing side,
      a throughbore passing through the body from the first opposing side to the second opposing side along a first axis, and
      a first magnet disposed on a second axis, wherein the second axis is laterally offset from and parallel to the first axis,
      wherein the first magnet is configured to apply magnetic force to removably attach the cinch-block to the first metallic object, and
      wherein the throughbore of the cinch-block is configured to align with the first aperture of the first metallic object and the first aperture of the second object;
   a cinch-pin comprising:
      a proximal end, a distal end, and an elongated midsection connecting the proximal and distal ends;
      wherein the cinch-pin is configured to pass through the aligned throughbore and apertures to securely fasten the first metallic object, the cinch-block, and the second object; and
      wherein the body of the cinch-block is configured to coact with at least one of the first metallic object, the second object, or both the first metallic object and the second object to limit rotation during fastening.

2. The magnetic fastening device according to claim 1, wherein at least a portion of the body of the cinch-block is uncovered by the first magnet.

3. The magnetic fastening device according to claim 1, wherein the cinch pin further comprises external threads disposed on at least a first threaded portion of a surface of the elongated midsection.

4. The magnetic fastening device according to claim 3, wherein the throughbore comprises internal threaded convolutions, and
   the external threads of the cinch-pin coact with the internal threaded convolutions to securely fasten the first metallic object, the cinch-block, and the second object.

5. The magnetic fastening device according to claim 1, wherein the cinch-block comprises at least a second magnet configured to apply magnetic force to removably attach the cinch-block to the first metallic object.

6. The magnetic fastening device according to claim 1, wherein the first metallic object comprises a hitch-mounted accessory shank, and the second object comprises a vehicle hitch receiver.

7. The magnetic fastening device according to claim 1, wherein the cinch-block further comprises:
   an engagement pin comprising a hollow passage, and
   a biasing member comprising a first end and a second end,
   wherein the first end of the biasing member is affixed to the second opposing side of the cinch-block, and the second end of the biasing member is affixed to the engagement pin,
   wherein the engagement pin is configured to align with the throughbore, the first apertures of the first metallic object and second object, a second aperture in the first metallic object, and a second aperture in the second object, and
   wherein the cinch-pin is configured to pass through the aligned throughbore and apertures to securely fasten the first metallic object, the cinch-block, and the second object.

8. The magnetic fastening device according to claim 1, wherein the cinch-pin further comprises a throughbore disposed in the distal end configured to engage a hitch pin clip, and
wherein the cinch-pin is configured to be inserted completely through the aligned throughbore, first aperture of the first metallic object, first aperture of the second object, a second aperture in the first metallic object, and a second aperture in the second object, to securely fasten the first metallic object, the cinch-block, and the second object.

9. The magnetic fastening device according to claim 1, wherein the cinch-pin further comprises:
a first length of the elongated midsection having a first diameter, and
a second length of the elongated midsection having a second diameter that is larger than the first diameter, and is disposed proximally from the first length, and
a third length having a third diameter that is smaller than the second diameter, and is slightly smaller than a diameter of the first aperture of the second object, and comprises a circular cross section,
wherein a first transition point between the first and second lengths defines a first flat flange, and a second transition point between the second and third lengths defines a second flat flange.

10. The magnetic fastening device according to claim 1, wherein the cinch-pin further comprises a non-cylindrical head disposed at the proximal end, and
wherein the head is configured to be manipulated by a corresponding tool to aid in tightening the cinch-pin.

11. A magnetic fastening device for fastening a first metallic object having a first aperture to a second object having a first aperture, the magnetic cinch-block fastening device comprising:
a cinch-block comprising:
a body comprising a first and a second opposing side,
a throughbore passing through the body from the first opposing side to the second opposing side, and
a first magnet,
wherein the first magnet is configured to apply magnetic force to removably attach the cinch-block to the first metallic object, and
wherein the throughbore of the cinch-block is configured to align with the first aperture of the first metallic object and the first aperture of the second object;
a cinch-pin comprising:
a proximal end, a distal end, and an elongated midsection connecting the proximal and distal ends;
wherein the cinch-pin is configured to pass through the aligned throughbore and apertures to securely fasten the first metallic object, the cinch-block, and the second object;
wherein the body of the cinch-block is configured to coact with at least one of the first metallic object, the second object, or both the first metallic object and the second object to limit rotation during fastening.

12. The magnetic fastening device according to claim 11, wherein the first magnet is disposed on an axis, and wherein the axis is laterally offset from and parallel to the throughbore.

13. The magnetic fastening device according to claim 11, further comprising a receiver portion configured to coact with the cinch-pin to securely fasten the first metallic object, the cinch-block, and the second object.

14. The magnetic fastening device according to claim 13, wherein:
the receiver portion comprises internal threaded convolutions,
the cinch-pin comprises external threaded convolutions, and
the external threaded convolutions and the internal threaded convolutions coact to securely fasten the first metallic object, the cinch-block, and the second object.

15. The magnetic fastening device according to claim 14, wherein the external threaded convolutions are disposed on at least one of the proximal end, the distal end, and/or the elongated midsection of the cinch-pin.

16. The magnetic fastening device according to claim 13, wherein the receiver portion comprises a lock, and the distal end of the cinch-pin comprises a groove, and the lock and groove are configured to coact to securely fasten.

17. The magnetic fastening device according to claim 11, wherein:
the throughbore of the cinch-block comprises a non-circular shape, and
the cinch pin comprises a non-circular cross-section configured to engage the throughbore and limit rotation when torque is applied to the cinch-pin.

18. The magnetic fastening device according to claim 17, wherein the non-circular cross-section is disposed on at least one of the proximal end, the distal end, and/or the elongated midsection of the cinch-pin.

19. The magnetic fastening device according to claim 11, wherein the throughbore of the cinch-block has a circular cross section.

20. A magnetic fastening device for securely fastening a tubular trailer-hitch accessory shank within a tubular trailer hitch receiver, the magnetic fastening device comprising:
a cinch-block comprising:
a body comprising a first opposing side and a second opposing side,
a throughbore having an axis and passing through the body from the first opposing side to the second opposing side, and
at least one magnet positioned on the first opposing side of the cinch-block and laterally offset from the axis of the throughbore;
a cinch-pin comprising:
a proximal end, a distal end, and an elongated midsection connecting the proximal and distal ends;
wherein the tubular trailer hitch accessory shank comprises a first sidewall having an exterior surface, a lumen, and a first aperture in the first sidewall extending from the exterior surface to the lumen,
wherein the tubular trailer-hitch receiver comprises a first sidewall and a first aperture in the first sidewall,
wherein the at least one magnet applies magnetic force to removably attach the cinch-block within the lumen of trailer-hitch accessory shank, and wherein the throughbore of the cinch-block is configured to align with the first aperture of the tubular trailer-hitch accessory shank and the first aperture of the tubular trailer hitch receiver,
wherein the cinch-pin is configured to pass through the throughbore of the cinch-block, the first aperture of the tubular trailer hitch accessory shank, and the first aperture of the trailer-hitch receiver to securely fasten the tubular trailer hitch-accessory shank to the tubular trailer hitch receiver,
wherein the cinch-pin is configured to securely fasten the tubular trailer hitch-accessory shank to the tubular trailer hitch receiver when entering the throughbore either from the first opposing side or the second opposing side of the cinch-block, and wherein the body of the cinch-block is configured to coact with the tubular trailer hitch accessory shank to limit rotation during fastening.

* * * * *